(12) United States Patent
Suleski et al.

(10) Patent No.: US 12,693,454 B1
(45) Date of Patent: Jul. 28, 2026

(54) OPTICALLY TRANSMISSIVE ELEMENT GENERATION FOR VARIABLE FUNCTION OPTICAL SYSTEM

(71) Applicant: The University of North Carolina at Charlotte, Charlotte, NC (US)

(72) Inventors: Thomas J. Suleski, Harrisburg, NC (US); Shohreh Shadalou, Fremont, CA (US)

(73) Assignee: THE UNIVERSITY OF NORTH CAROLINA AT CHARLOTTE, Charlotte, NC (US)

( * ) Notice: Subject to any disclaimer, the term of this patent is extended or adjusted under 35 U.S.C. 154(b) by 659 days.

(21) Appl. No.: 18/176,591

(22) Filed: Mar. 1, 2023

Related U.S. Application Data

(60) Provisional application No. 63/317,250, filed on Mar. 7, 2022.

(51) Int. Cl.
G02B 3/00 (2006.01)
G02B 7/10 (2021.01)
G02B 27/00 (2006.01)

(52) U.S. Cl.
CPC ........... G02B 3/0081 (2013.01); G02B 7/102 (2013.01); G02B 27/0012 (2013.01)

(58) Field of Classification Search
CPC .. G02B 27/0012; G02B 7/102; G02B 3/0012; G02B 3/14; G02B 2003/0093; G02C 7/02
(Continued)

(56) References Cited

U.S. PATENT DOCUMENTS

| | | | |
|---|---|---|---|
| 1,143,316 A | 6/1915 | Poullain et al. | |
| 2,001,952 A | 5/1935 | James | |

(Continued)

FOREIGN PATENT DOCUMENTS

GB 250268 A 7/1926

OTHER PUBLICATIONS

Acosta, E., et al., "Micro-Alvarez lenses for a tunable-dynamic-range Shack-Hartmann wavefront sensor," Jpn. J. Appl. Phys. 53(8S2), 08MG04 (2014).
(Continued)

*Primary Examiner* — Travis S Fissel

(57) ABSTRACT

An example is a method by a processor(s). First and second boundary thickness variations ($T_A$, $T_B$) of first and second boundary elements (A, B) are obtained. The A, B are configured to obtain first and second boundary conditions of a variable function optical system. First and second functional thickness variations ($T_{F1}$, $T_{F2}$) of first and second optically transmissive elements of the variable function optical system are determined. Determining the $T_{F1}$ includes a first sum of a first term and a second term, and determining the $T_{F2}$ includes a second sum of a third term and a fourth term. The first and third terms each are based on an integration of the $T_A$, $T_B$. The second and fourth terms each are based on an average thickness variation of the $T_A$, $T_B$. A design file is generated including digital representations of the optically transmissive elements based on the $T_{F1}$, $T_{F2}$.

20 Claims, 25 Drawing Sheets

(58) Field of Classification Search

USPC ........................................................ 359/676

See application file for complete search history.

(56) References Cited

U.S. PATENT DOCUMENTS

| | | | |
|---|---|---|---|
| 2,109,474 | A | 3/1938 | Ernest |
| 2,475,275 | A | 7/1949 | Birchall |
| 3,305,294 | A | 2/1967 | Alvarez |
| 3,507,565 | A | 4/1970 | Alvarez et al. |
| 3,583,790 | A | 6/1971 | Baker |
| 3,903,218 | A * | 9/1975 | Humphrey ....... B29D 11/00855 |
| | | | 425/808 |
| 4,736,734 | A | 4/1988 | Matsuura et al. |
| 5,299,053 | A | 3/1994 | Kleinburg et al. |
| 6,961,188 | B2 | 11/2005 | Betensky et al. |
| 7,845,834 | B2 | 12/2010 | Hou |
| 8,503,102 | B2 | 8/2013 | Yamanashi |
| 9,238,577 | B2 | 1/2016 | Suleski et al. |
| 2017/0192253 | A1 * | 7/2017 | Rubinstein ........... G02B 3/0081 |

OTHER PUBLICATIONS

Benitez, P., et al., "Design in 3D geometry with the Simultaneous Multiple Surface design method of Nonimaging Optics," Proc. SPIE 3781, 12-21 (1999).

Berge, B., et al., "Variable focal lens controlled by an external voltage: An application of electrowetting," Eur. Phys. J. E 3(2), 159-163 (2000).

Cai, J.Y., et al., "Optical design of the focal adjustable flashlight based on a power white-LED," Proc. SPIE 8128, 812806 (2011).

Chen, F., et al., "Free-form lenses for high illumination quality light-emitting diode MR16 lamps," Opt. Eng. 48(12), 123002 (2009).

Chen, J.J., et al., "Freeform lens design for LED collimating illumination," Opt. Express 20(10), 10984-10995 (2012).

Ding, Y., et al., "Freeform LED lens for uniform illumination," Opt. Express 16(17), 12958-12966 (2008).

Driscoll, T.A., et al., Fundamentals of Numerical Computation, 5.6. Numerical integration, https://tobydriscoll.net/fnc-julia/localapprox/integration.html, accessed Jun. 8, 2023.

Driscoll, T.A., et al., Fundamentals of Numerical Computation, Home, https://tobydriscoll.net/fnc-julia/frontmatter.html, accessed Jun. 8, 2023.

Fournier, F.R., et al., "Designing freeform reflectors for extended sources," Proc. SPIE 7423, 742302 (2009).

Hu, R., et al., "Design of double freeform-surface lens for LED uniform illumination with minimum Fresnel losses," Optik 124(19), 3895-3897 (2013).

Hui, X., et al., "Realization of uniform and collimated light distribution in a single freeform-Fresnel double surface LED lens," Appl. Opt. 56(15), 4561-4565 (2017).

Juntunen, E., et al., "Rapid prototyping of freeform optics for an LED downlighter with a dynamically adjustable beam," Light Res. Technol. 48(7), 885-897 (2016).

Koerber, J., et al., "Broadband Variable Transmission Sphere for Fizeau Interferometry," Optics 3(1), 88-98 (2022).

Li, W., et al., "Variable-diameter beam-shaping system design with high zoom ratio containing aspheric optical components," Appl. Opt. 60(3), 705-713 (2021).

Lin, H.C., et al., "A Review of Electrically Tunable Focusing Liquid Crystal Lenses," Trans. Electr. & Electron. Mater. 12(6), 234-240 (2011).

Lohmann, A.W., "A New Class of Varifocal Lenses," Appl. Opt. 9(7), 1669-1671 (1970).

Ma, D., et al., "Tailoring freeform illumination optics in a double-pole coordinate system," Appl. Opt. 54(9), 2395-2399 (2015).

Mao, X., et al., "Two-step design method for highly compact three-dimensional freeform optical system for LED surface light source," Opt. Express 22(S6), A1491-A1506 (2014).

Miñano, J.C., et al., "High-efficiency free-form condenser overcoming rotational symmetry limitations," Opt. Express 16(25), 20193-20205 (2008).

Moein, S., et al., "Freeform optics for variable extended depth of field imaging," Opt. Express 29(24), 40524-40537 (2021).

Nguyen, N.T., "Micro-optofluidic Lenses: A review," Biomicrofluidics 4(3), 031501 (2010).

Palusinski, I.A., et al., "Lateral-shift variable aberration generators," Appl. Opt. 38(1), 86-90 (1999).

Rege, S.S., et al., "Application of the Alvarez-Humphrey concept to the design of a miniaturized scanning microscope," Opt. Express 12(12), 2574-2588 (2004).

Ren, H., et al., "Variable-focus liquid lens," Opt. Express 15(10), 5931-5936 (2007).

Rolland, J.P., et al., "Freeform optics for imaging," Optica 8(2), 161-176 (2021).

Sato, S., "Liquid-Crystal Lens-Cells with Variable Focal Length," Jpn. J. Appl. Phys. 18(9), 1679-1684 (1979).

Shadalou, S., et al., "General design method for dynamic freeform optics with variable functionality," Opt. Express 30(11), 19974-19989 (2022).

Shadalou, S., et al., "Tunable illumination for LED-based systems using refractive freeform arrays," Opt. Express 29 (22), 35755-35764 (2021).

Shultz, J.A., "Design, tolerancing, and experimental characterization of dynamic freeform optical systems," Ph.D. dissertation (The University of North Carolina at Charlotte, 2017).

Smilie, P.J., "Dynamic optical systems through laterally translated refractive freeform elements," M.S. in Applied Physics (The University of North Carolina at Charlotte, 2011).

Smilie, P.J., et al., "Variable-diameter refractive beam shaping with freeform optical surfaces," Opt. Lett. 36(21), 4170-4172 (2011).

Suleski, T.J., et al., "Design of Dynamic Freeform Optics," in Renewable Energy and the Environment, (Optical publishing group, 2013), paper FW2B.2.

Suleski, T.J., et al., "Dynamic beam shaping with freeform optics," Proc. SPIE 9194, 91940K (2014).

Wilson, A., et al., "Design and demonstration of a vari-focal optical see-through head-mounted display using freeform Alvarez lenses," Opt. Express 27(11), 15627-15637 (2019).

Wu, R., et al., "A mathematical model of the single freeform surface design for collimated beam shaping," Opt. Express 21(18), 20974-20989 (2013).

Wu, R., et al., "Design of Freeform Illumination Optics," Laser Photonics Rev. 12(7), 1700310 (2018).

Ye, M., et al., "Optical Properties of Liquid Crystal Lens of Any Size," Jpn. J. Appl. Phys. 41 (Part 2, No. 5B), L571-L573 (2002).

Zhang, D.Y., et al., "Fluidic adaptive lens with high focal length tunability," Appl. Phys. Lett. 82(19), 3171-3172 (2003).

Zhenrong, Z., et al., "Freeform surface lens for LED uniform illumination," Appl. Opt. 48(35), 6627-6634 (2009).

* cited by examiner $$T_A(x,y) \neq -T_B(x,y)$$

$$T_{A'}(x,y) = -T_{B'}(x,y)$$

$$T_{F1'} = -T_{F2'} = \frac{1}{2a_{max}} \int T_{A'}(x,y)dx$$

$$T_{F1} = T_{F1'} + \frac{T_{avg}}{2} \ , \ T_{F2} = T_{F2'} + \frac{T_{avg}}{2}$$

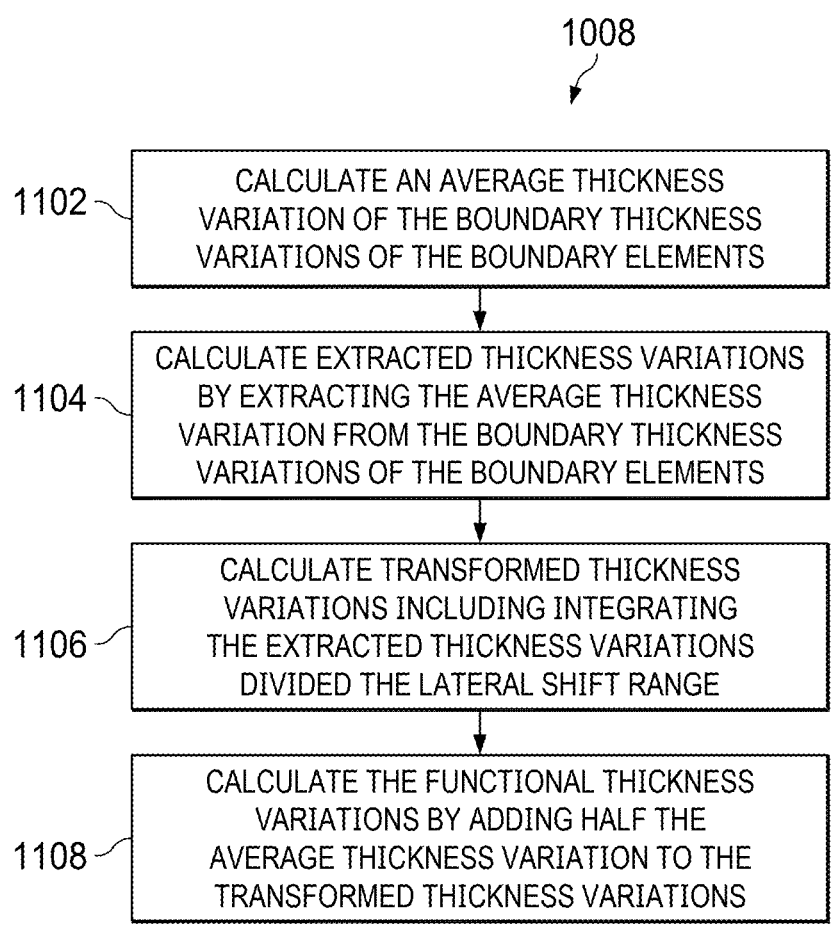

1008

1102 — CALCULATE AN AVERAGE THICKNESS VARIATION OF THE BOUNDARY THICKNESS VARIATIONS OF THE BOUNDARY ELEMENTS

1104 — CALCULATE EXTRACTED THICKNESS VARIATIONS BY EXTRACTING THE AVERAGE THICKNESS VARIATION FROM THE BOUNDARY THICKNESS VARIATIONS OF THE BOUNDARY ELEMENTS

1106 — CALCULATE TRANSFORMED THICKNESS VARIATIONS INCLUDING INTEGRATING THE EXTRACTED THICKNESS VARIATIONS DIVIDED THE LATERAL SHIFT RANGE

1108 — CALCULATE THE FUNCTIONAL THICKNESS VARIATIONS BY ADDING HALF THE AVERAGE THICKNESS VARIATION TO THE TRANSFORMED THICKNESS VARIATIONS

FIG. 11

FIG. 12D
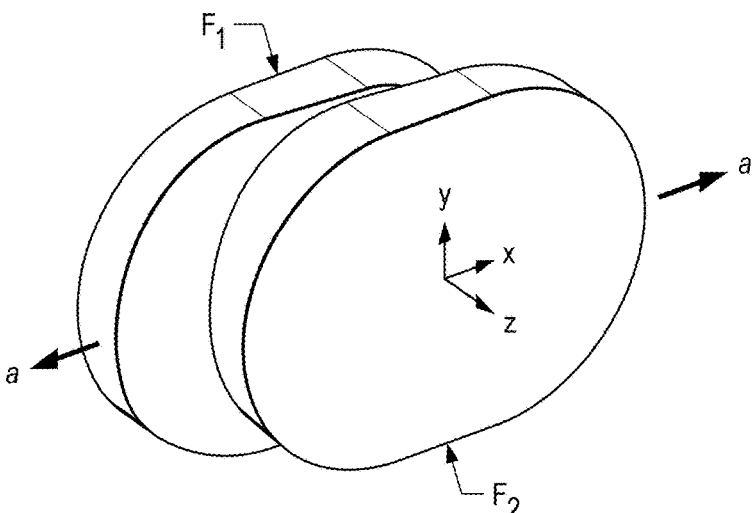
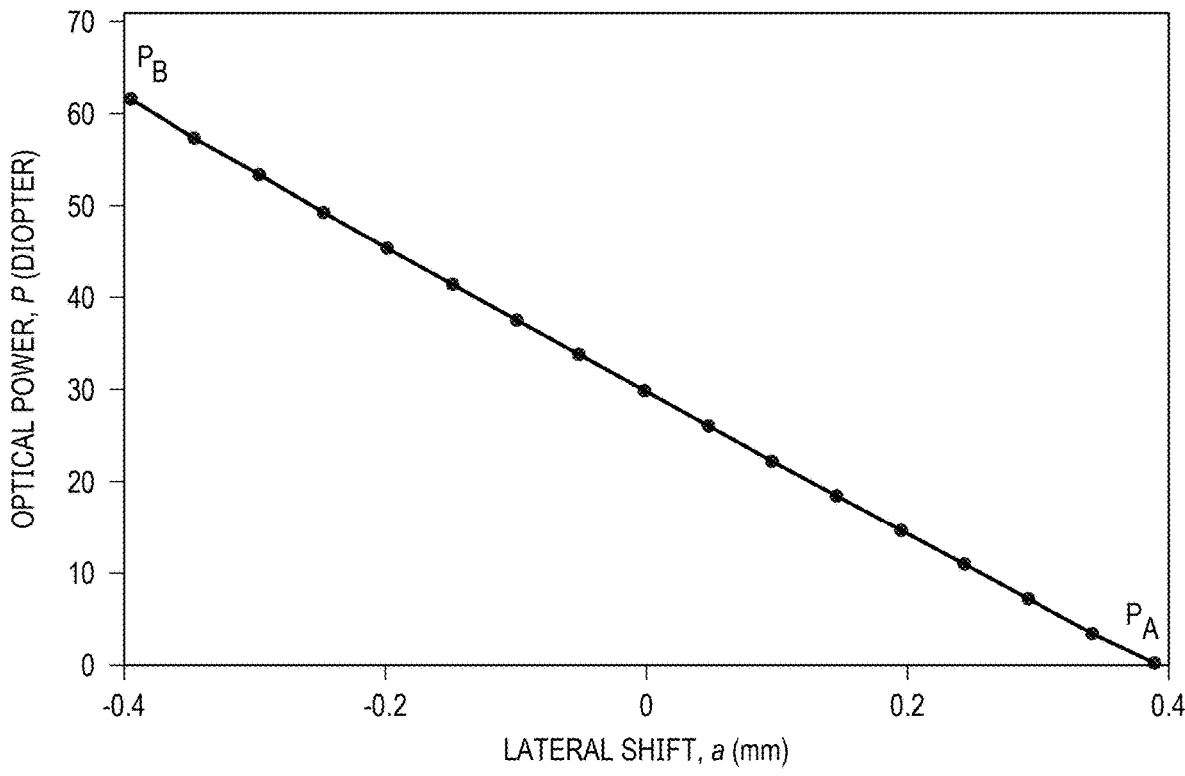

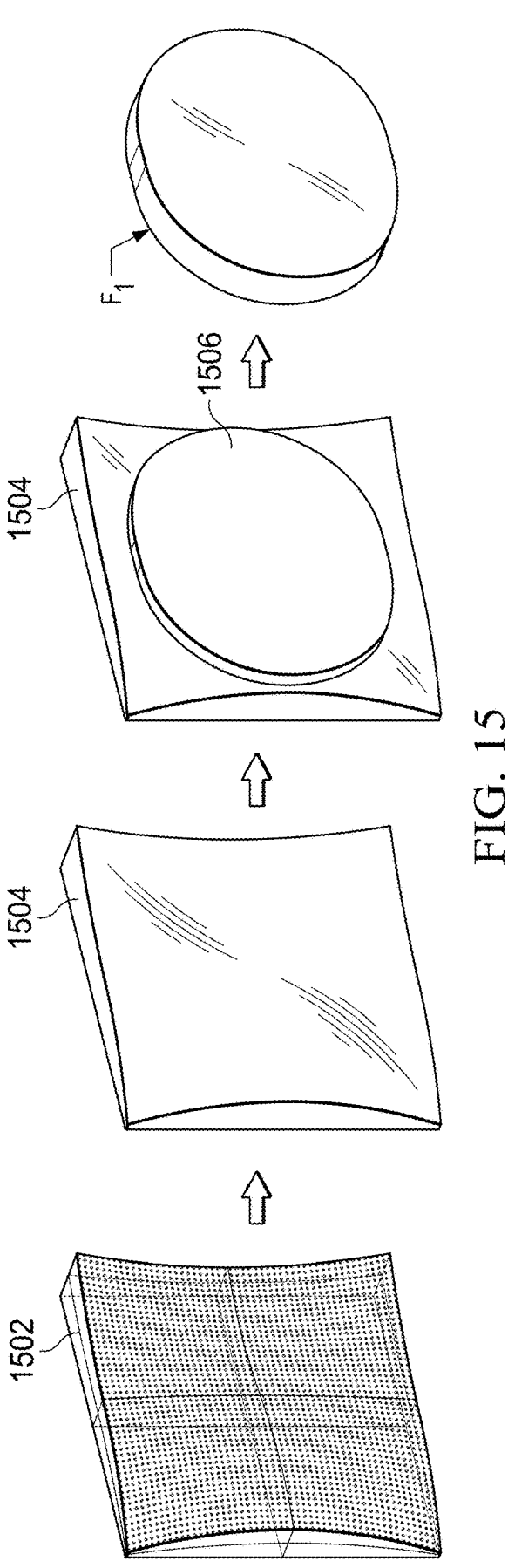
FIG. 15

OPTICALLY TRANSMISSIVE ELEMENT GENERATION FOR VARIABLE FUNCTION OPTICAL SYSTEM

RELATED APPLICATIONS

This application claims priority to and the benefit of U.S. Provisional Patent Application Ser. No. 63/317,250, filed on Mar. 7, 2022, entitled "Computer Implemented Methods for Dynamic Freeform Optical Design," which is hereby incorporated herein by reference in its entirety.

GOVERNMENT LICENSE RIGHTS

This invention was made with United States (U.S.) government support under Contract No. 1338898 awarded by the National Science Foundation (NSF). The U.S. government has certain rights in the invention.

TECHNICAL FIELD

The present disclosure relates to generation of optically transmissive elements for optical systems, and more particularly, for variable function optical systems.

BACKGROUND

Initial attempts to provide a continuously variable optical property can be seen in tunable optical power systems. The traditional zoom lens system is a well-known example in this area enabling variable optical power by applying axial movement(s) to the optical element(s). The dynamic optical property can also be achieved by applying a lateral shift rather than an axial movement to the optical element(s); however, these systems include freeform or non-radially symmetric elements. Significant improvements in high-precision manufacturing and metrology pave the way for utilizing freeform lenses in modern optical systems. The first tunable optical power system enabled by lateral shifts of two refractive elements was based on the superposition concept enabled by two laterally-shifted cylinder lenses with varying radius of curvature (ROC). Among other things, large lateral shifts required in this approach can be considered as a significant drawback for this approach.

Later, Alvarez presented an approach to design a varifocal lens system to enable continuously tunable spherical power by applying small lateral opposite shifts to freeform pair plates with matching cubic surfaces. This design method was based on the derivative of the matching surfaces. This approach was later extended. The composite optical thickness in this approach is proportional to the relative lateral opposite shifts of pair plates and the derivative of their freeform matching surfaces. At this point, dynamic freeform designs enabled by laterally shifted lens pairs were not limited to adjustable optical power, and systems with tunability in other optical properties, such as variable aberration generators, were enabled in design.

In the general form of this design method, the depth modulation of the composite thickness of pair elements is equal to zero where no shift applies and inverse as opposite shifts apply in positive and negative directions. Destroying this symmetry along the working range has been reported in an adjustable positive optical power system for a Shack-Hartmann wavefront sensor. However, when it comes to other optical properties such as beam shaping, destroying the symmetry along the working range is challenging.

In 2011, refractive two-element systems converting Gaussian laser beam distribution to the adjustable size of flat-top output were reported. In this approach, multiple fixed beam shapers were initially designed using the energy mapping concept and represented by fitted aspheric equations. Then, a base and variable component were defined to construct the identical freeform lens pair by expanding the derivative approach. The need for multiple fixed designs and curve fitting is a noticeable drawback of this approach which makes it so time-consuming.

SUMMARY

An example described herein is a method. A first boundary thickness variation of a first boundary element and a second boundary thickness variation of a second boundary element are obtained by one or more processors. The first boundary element is configured to obtain a first boundary condition of a variable function optical system, and the second boundary element is configured to obtain a second boundary condition of the variable function optical system. A first functional thickness variation of a first optically transmissive element of the variable function optical system and a second functional thickness variation of a second optically transmissive element of the variable function optical system are determined by the one or more processors. Determining the first functional thickness variation includes a first sum of a first term and a second term, and determining the second functional thickness variation includes a second sum of a third term and a fourth term. Each term of the first term and the third term is based on an integration of the first boundary thickness variation and the second boundary thickness variation. Each term of the second term and the fourth term is based on an average thickness variation of the first boundary thickness variation and the second boundary thickness variation. A design file is generated by the one or more processors. The design file includes a first digital representation of the first optically transmissive element based on the first functional thickness variation and includes a second digital representation of the second optically transmissive element based on the second functional thickness variation.

Another example described is a system. The system includes a memory storing instructions and one or more processors that are coupled with the memory and to execute the instructions. The instructions when executed cause the one or more processors to: obtain a first boundary thickness variation of a first boundary element and a second boundary thickness variation of a second boundary element; determine a first functional thickness variation of a first optically transmissive element of a variable function optical system and a second functional thickness variation of a second optically transmissive element of the variable function optical system; and generate a design file. The first boundary element is configured to obtain a first boundary condition of the variable function optical system, and the second boundary element is configured to obtain a second boundary condition of the variable function optical system. Determining the first functional thickness variation includes a first sum of a first term and a second term, and determining the second functional thickness variation includes a second sum of a third term and a fourth term. Each term of the first term and the third term is based on an integration of the first boundary thickness variation and the second boundary thickness variation. Each term of the second term and the fourth term is based on an average thickness variation of the first boundary thickness variation and the second boundary thickness variation. The design file includes a first digital representation of the first optically transmissive element based on the first functional thickness variation and includes a second digital representation of the second optically transmissive element based on the second functional thickness variation.

A further example described herein is a method. A first boundary thickness variation $T_A(x,y)$ of a first boundary element and a second boundary thickness variation $T_B(x,y)$ of a second boundary element are obtained by one or more computer systems. The first boundary element is configured to obtain a first boundary condition of a variable function optical system, and the second boundary element is configured to obtain a second boundary condition of the variable function optical system. A lateral shift range $2a_{max}$ of a first optically transmissive element and a second optically transmissive element of the variable function optical system is obtained by the one or more computer systems. A first functional thickness variation $T_{F_1}(x,y)$ of the first optically transmissive element and a second functional thickness variation $T_{F_2}(x,y)$ of the second optically transmissive element are determined by the one or more computer systems. $T_{F_1}(x,y)$ is calculated to include $$\frac{1}{2a_{max}} \int \frac{T_A(x,\,y) - T_B(x,\,y)}{2} dx + \frac{T_A(x,\,y) + T_B(x,\,y)}{4},$$

and $T_{F_2}(x,y)$ is calculated to include $$-\frac{1}{2a_{max}} \int \frac{T_A(x,\,y) - T_B(x,\,y)}{2} dx + \frac{T_A(x,\,y) + T_B(x,\,y)}{4}.$$

A design file is generated by the one or more computer systems. The design file includes a first digital representation of the first optically transmissive element based on the first functional thickness variation $T_{F_1}(x,y)$ and includes a second digital representation of the second optically transmissive element based on the second functional thickness variation $T_{F_2}(x,y)$.

BRIEF DESCRIPTION OF THE DRAWINGS

The disclosure will be understood more fully from the detailed description given below and from the accompanying figures of examples of the disclosure. The figures are used to provide knowledge and understanding of examples of the disclosure and do not limit the scope of the disclosure to these specific examples. Furthermore, the figures are not necessarily drawn to scale.

FIG. 11 illustrates intermediate calculations for a determination of FIG. 10 according to some examples.

FIGS. 12A, 12B, 12C, and 12D illustrate aspects of a first analytical example.

FIG. 15 illustrates construction of a desired geometry of a functional optically transmissive element for a first numerical example.

FIGS. 17A-1, 17A-2, 17B-1, 17B-2, and 17B-3 illustrate aspects of a third numerical example.

DETAILED DESCRIPTION

Figure 1:
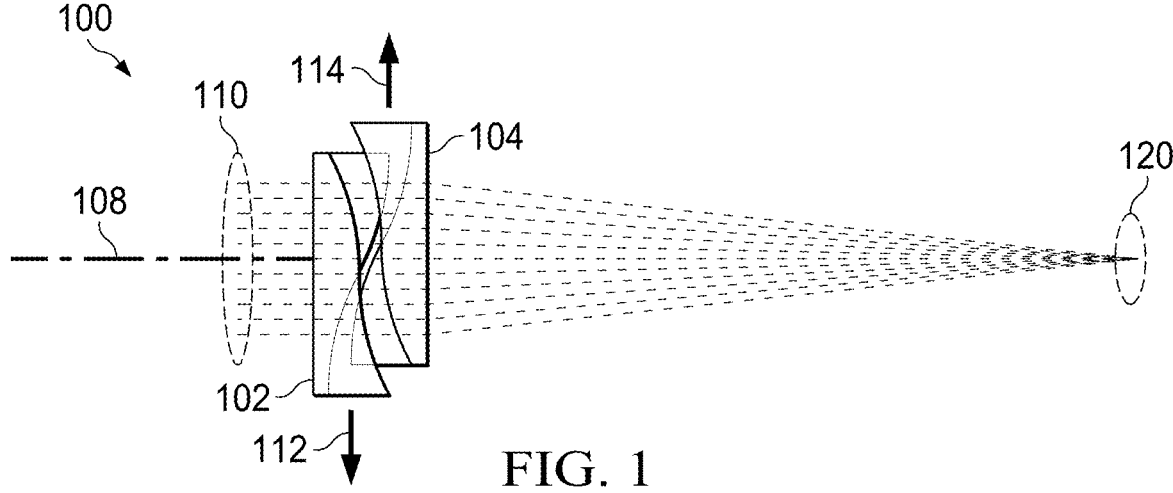
FIGS. 1 and 2 show a simplified variable function optical system according to some examples.

Aspects of the present disclosure relate to optically transmissive element generation for a variable function optical system. Generally, a variable function optical system may include optically transmissive elements that may be laterally shifted (e.g., translated) in opposing directions transverse to an optical axis. Collimated light (e.g., in a visible and/or non-visible spectrum) may propagate parallel to the optical axis and through the optically transmissive elements. The light may have a first boundary condition at a target plane when the optically transmissive elements are in a first shifted position, and may have a second boundary condition at the target plane when the optically transmissive elements are in a second, different shifted position. The boundary conditions may vary by pattern, power, or a combination thereof of the light at the target plane. The methodology described herein overcomes technical problems, limitations, and challenges of prior approaches such that, for example, complex freeform surfaces for the optically transmissive elements may be generated. For clarity, a freeform surface is a surface that does not have an axis of symmetry, such as radial or cylindrical. Such complex freeform surfaces may permit a variable function optical system to achieve complex boundary conditions that could not have been previously achieved in a variable function optical system.

Previous design approaches reported for dynamic freeform optically transmissive elements have been limited to enabling optical composites with similar optical functions. The similar optical functions limitation can limit the differences between the boundary conditions. For instance, the design of a dynamic pattern beam shaper being able to vary a uniform square pattern to a uniform circular pattern from a Gaussian beam input using currently available design methods can be challenging, if not impossible. Further, current reported dynamic design implementations are mostly analytical. The analytic design approach has several technical problems, challenges, and limitations including: (i) the need for analytic surface equations, (ii) challenges in curve fitting of complicated surfaces, and (iii) challenges in integrating analytically to obtain a dynamic freeform surface. A numerical approach may have several potential advantages, such as being not limited by surface equations, no need for the curve fitting steps, and enabling new design concepts.

Generally, examples described herein provide a methodology for generating functional optically transmissive elements of a variable function optical system. Desired boundary conditions for the variable function optical system are identified, and boundary thickness variations of boundary elements (e.g., optically transmissive elements) that result in the respective boundary conditions are obtained. An absolute value of a maximum lateral shift of the functional optically transmissive elements is obtained. Functional thickness variations of the functional optically transmissive elements are determined by, among other things, summing (i) an appropriate proportional amount of integral of a difference of the boundary thickness variations divided by a maximum lateral shift (e.g., a lateral shift range), and (ii) an appropriate proportional amount of the boundary thickness variations. From the functional thickness variations, the functional optically transmissive elements can be generated and manufactured. It is noted that "boundary", "functional", and other adjectives used herein with reference to a thickness variation are merely for clarity to aid in easily identifying which thickness variation is being described.

Technical advantages of the present disclosure include, but are not limited to, an ability to achieve more complex and broader boundary conditions of a variable function optical system. Examples described herein overcome the above-described technical problems, limitations, and challenges of previous approaches. Vastly different boundary conditions may be achieved in a variable function optical system by implementing example methodologies described herein. Boundary elements (that achieve the boundary conditions) used in a methodology are not required to be inverses of each other, which permits a wider range of boundary conditions that may be implemented. Additionally, curve fitting may be obviated by examples. Further, more complex boundary conditions resulting from complex freeform surfaces may be achieved. Example methodologies may be implemented analytically or numerically. Complex boundary conditions and complex freeform surfaces may be more susceptible to being analyzed numerically rather than analytically. Example methodologies implementing numerical analysis may make possible boundary conditions for a variable function optical system that were not possible previously.

A variable function optical system may be implemented in numerous applications. For example, a variable function optical system may be implemented where double/multiple modes of operations are desired, such as microscopy/metrology applications offering a higher range of resolution and field of view (FOV). A variable optical property may improve optical functionality in both imaging and non-imaging applications. Some imaging examples include an aberration generator, a depth of field extender, a FOV extender, etc., and some non-imaging examples include interior/exterior lighting, medical/dermatology treatments, augmented reality (AR) and/or virtual reality (VR), automotive lighting, visible/infrared (VIS/IR) illuminators, beam shaping, lithography, etc.

Various examples now will be described more fully hereinafter in the following detailed description, in which some, but not all examples are described. Indeed, implementations of the claims may be embodied in many different forms, and the claims should not be construed as limited to the examples set forth herein. Rather, these examples are provided so that this disclosure will satisfy applicable legal requirements.

Figure 2:
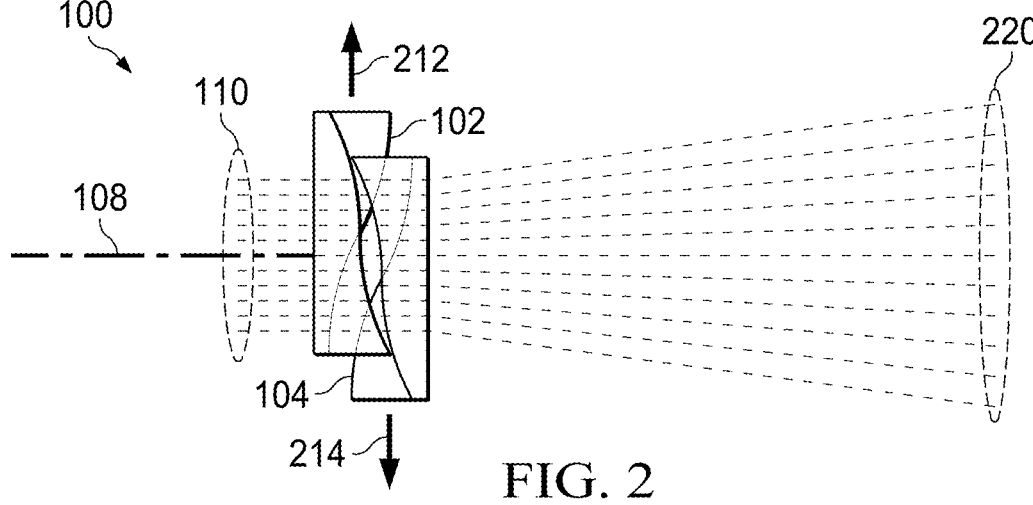

FIGS. 1 and 2 show a simplified variable function optical system 100 according to some examples. The variable function optical system 100 includes a first functional optically transmissive element 102 and a second functional optically transmissive element 104. The functional optically transmissive elements 102, 104 are oriented generally perpendicular to an optical axis 108 along which collimated light 110 propagates. Although described with respect to collimated light, non-collimated light may be implemented in other examples, and concepts described throughout this description may be applicable to non-collimated light.

Referring to FIG. 1, the functional optically transmissive elements 102, 104 are translated in opposing directions in a plane transverse to the optical axis 108 to achieve a first boundary condition 120. The first functional optically transmissive element 102 is translated 112 a positive maximum lateral shift $+|a_{max}|$, and the second functional optically transmissive element 104 is translated 114 a negative maximum lateral shift $-|a_{max}|$. In the positions of the functional optically transmissive elements 102, 104 shown in FIG. 1, the collimated light 110 passes through the functional optically transmissive elements 102, 104. The functional optically transmissive elements 102, 104 refract the collimated light to achieve the first boundary condition 120 at a target plane based on the refractive indices of the functional optically transmissive elements 102, 104 and the curvatures of the surfaces of the functional optically transmissive elements 102, 104 through which the collimated light 110 is transmitted while the functional optically transmissive elements 102, 104 are so positioned.

Referring to FIG. 2, the functional optically transmissive elements 102, 104 are translated in opposing directions in a plane transverse to the optical axis 108 to achieve a second boundary condition 220. The first functional optically transmissive element 102 is translated 212 a negative maximum lateral shift $-|a_{max}|$, and the second functional optically transmissive element 104 is translated 214 a positive maximum lateral shift $+|a_{max}|$. In the positions of the functional optically transmissive elements 102, 104 shown in FIG. 2, the collimated light 110 passes through the functional optically transmissive elements 102, 104. The functional optically transmissive elements 102, 104 refract the collimated light to achieve the second boundary condition 220 based on the refractive indices of the functional optically transmissive elements 102, 104 and the curvatures of the surfaces of the functional optically transmissive elements 102, 104 through which the collimated light 110 is transmitted while the functional optically transmissive elements 102, 104 are so positioned.

The traversal of both of the functional optically transmissive elements 102, 104 from the positive maximum lateral shift $+|a_{max}|$ to the negative maximum lateral shift $-|a_{max}|$ indicates a lateral shift range. For clarity, if the functional optically transmissive elements 102, 104 are described as being translated by some positive lateral shift $+|a|$, it is to be understood that the described positive lateral shift $+|a|$ is for the first functional optically transmissive element 102, and that the second functional optically transmissive element 104 is translated by a corresponding opposing amount, e.g., the negative lateral shift $-|a|$. For example, the positioning of the functional optically transmissive elements 102, 104 as shown in FIG. 1 may be described as the functional optically transmissive elements 102, 104 being translated to a positive maximum lateral shift $+|a_{max}|$. Further, the positioning of the functional optically transmissive elements 102, 104 as shown in FIG. 2 may be described as the functional optically transmissive elements 102, 104 being translated to a negative maximum lateral shift $-|a_{max}$. A lateral shift a, as used herein and without a negative indication, is assumed to be a positive, non-zero number such that a=|a|>0. The terms a and |a| may be used interchangeably.

The functional optically transmissive elements 102, 104 may each be a freeform optically transmissive element. A freeform optically transmissive element includes at least one surface (e.g., through which light is transmitted) that is freeform (e.g., that does not have an axis of symmetry, such as radial or cylindrical). Freeform surfaces of the functional optically transmissive elements 102, 104 may enable the variability of the variable function optical system 100. As illustrated, the functional optically transmissive elements 102, 104 are each be a plano-freeform optically transmissive element. A plano-freeform optically transmissive element has one surface (e.g., through which light is transmitted) that is a plane and another surface (e.g., through which light is transmitted) that is freeform. Example methodologies described herein may achieve or generate functional optically transmissive elements 102, 104 having any configuration, such as plano-freeform, dual freeform, radial symmetry for one or more surfaces, or the like.

Various methodologies described herein assume no gap between the functional optically transmissive elements 102, 104; however, practically, a gap may be between the functional optically transmissive elements 102, 104 in the variable function optical system 100. A gap between the functional optically transmissive elements 102, 104 may permit the functional optically transmissive elements 102, 104 to be translated without impacting or colliding with each other. The gap may include air or some other gas or fluid, or may be a vacuum. When air is in the gap, the refractive index of air (e.g., n=1.000293) is such that the difference between no gap and a gap filled with air may be negligible in the described methodologies. The described examples may be modified to include consideration of a gap with materials of various refractive indexes.

Further, various methodologies described herein assume that the refractive indexes of the functional optically transmissive elements 102, 104 are equal. In some examples, the functional optically transmissive elements 102, 104 are assumed to be a same material such that the refractive indexes are equal. In other examples, the methodologies may be modified to accommodate different refractive indexes and/or different materials for the functional optically transmissive elements 102, 104.

Figure 3:
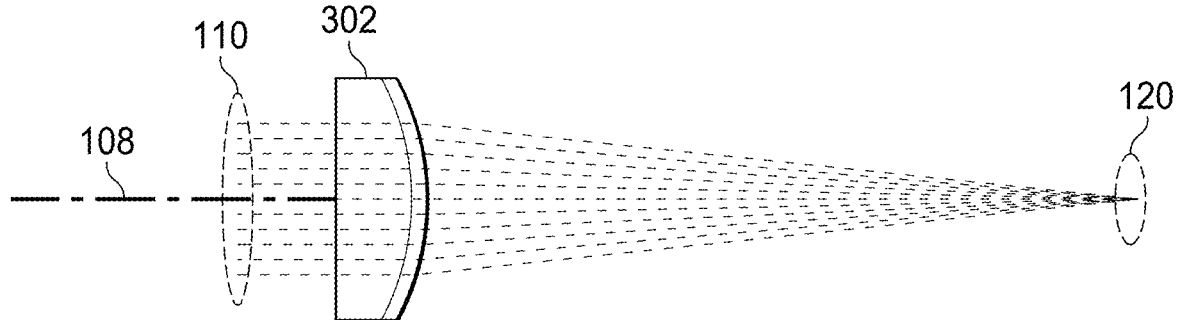
FIG. 3 illustrates a first boundary element according to some examples.
Figure 4:
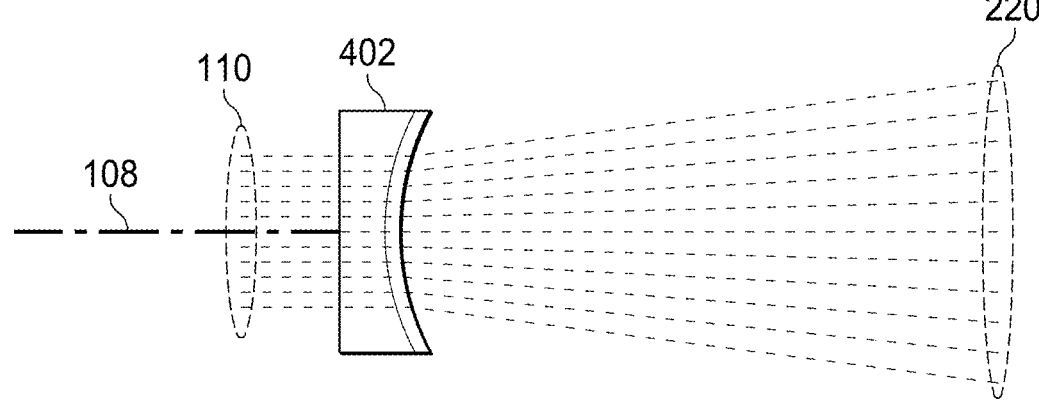
FIG. 4 illustrates a second boundary element according to some examples.

FIG. 3 illustrates a first boundary element 302 according to some examples. The first boundary element 302 is an optically transmissive element that, when collimated light 110 along the optical axis 108 is transmitted therethrough, achieves the first boundary condition 120 of FIG. 1. FIG. 4 illustrates a second boundary element 402 according to some examples. The second boundary element 402 is an optically transmissive element that, when collimated light 110 along the optical axis 108 is transmitted therethrough, achieves the second boundary condition 220 of FIG. 2. Functions and characteristics related or corresponding to the first boundary element 302 hereinafter are designated by an "A" subscript, and functions and characteristics related or corresponding to the second boundary element 402 hereinafter are designated by a "B" subscript.

As described below, the boundary elements 302, 402 and characteristics thereof are used to determine the functional optically transmissive elements 102, 104. As a note, the boundary elements 302, 402 may be static (e.g., not moving) to achieve the boundary conditions 120, 220. The functional optically transmissive elements 102, 104 are dynamic (e.g., configured to be translated) within the variable function optical system 100. To accommodate the translation of the functional optically transmissive elements 102, 104, respective apertures of the functional optically transmissive elements 102, 104 may be enlarged along the direction of translation relative to the apertures of the boundary elements 302, 402. The apertures of the functional optically transmissive elements 102, 104 may be enlarged to include an additional lateral shift range $2a_{max}$ more than the boundary elements 302, 402, respectively.

Figure 5:
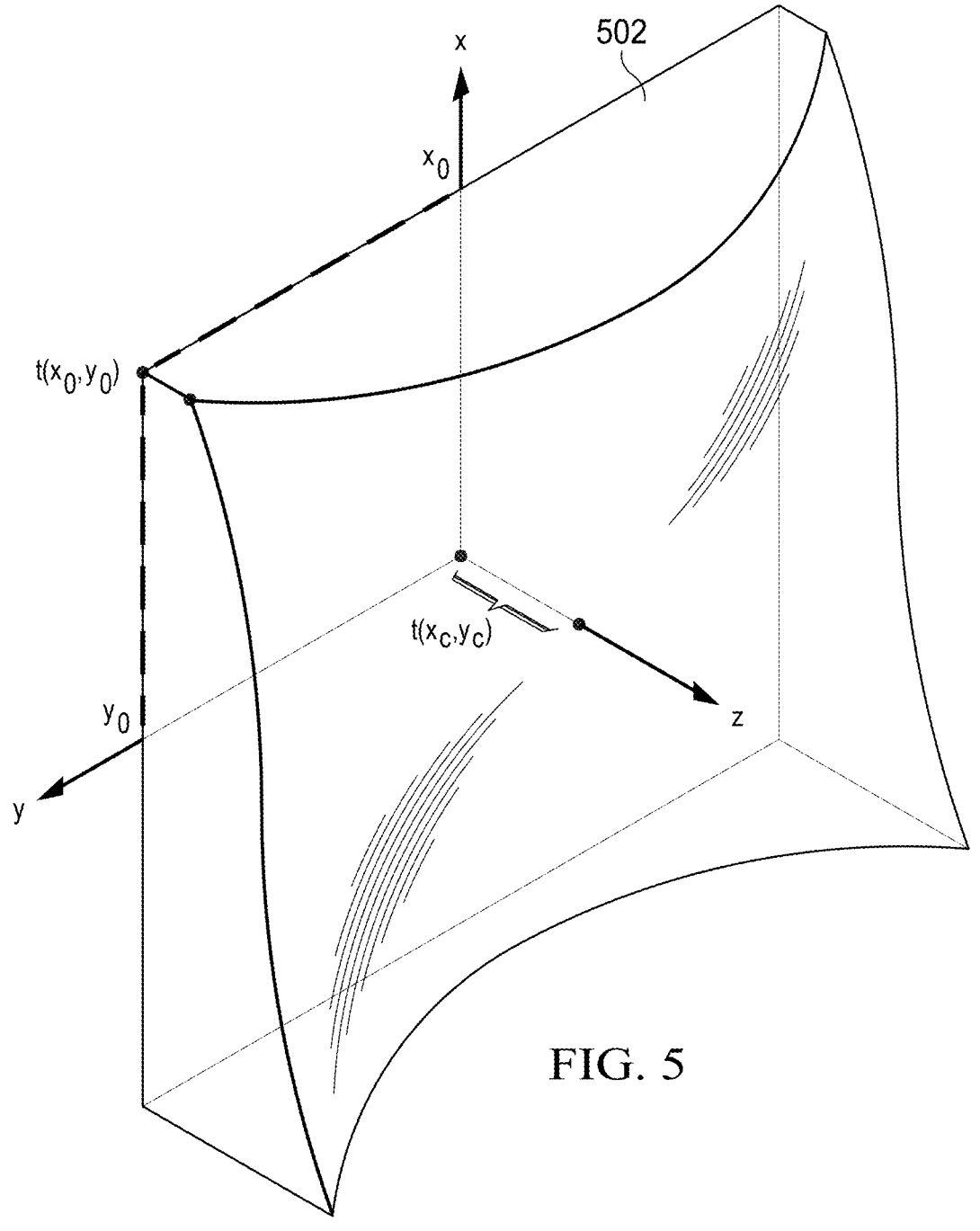
FIG. 5 illustrates an optically transmissive element showing various thicknesses according to some examples.

In the described methodologies, an optically transmissive element has a thickness t(x,y) as a function of a point (x,y) in a plane transverse to an optical axis through the optically transmissive element. The thickness t(x,y) is in a direction parallel to the optical axis. FIG. 5 illustrates an optically transmissive element 502 showing a thickness $t(x_0,y_0)$ at point $(x_0,y_0)$ in an x-y plane. In FIG. 5, the z-axis is or is parallel to the optical axis, and the x-y plane is the plane transverse to the optical axis. In reference to the boundary elements 302, 402 described above, the first boundary element 302 may be described as having a thickness $t_A(x,y)$, and the second boundary element 402 may be described as having a thickness $t_B(x,y)$.

A thickness variation T(x,y) is the difference between the thickness t(x,y) of an optically transmissive element at point (x,y) and the thickness $t(x_c,y_c)$ of the optically transmissive element at an origin point $(x_c,y_c)$, which is noted in this example as the center point of the x-y plane. FIG. 5 shows a thickness $t(x_c,y_c)$ of the optically transmissive element 502 at origin (e.g., center) point $(x_c,y_c)$. The thickness variation T(x,y) may be expressed as shown below in Equation (1):

$$T(x,y)=t(x,y)-t(x_c,y_c) \qquad \text{Eq. (1)}$$

To determine functional thickness variations of functional optically transmissive elements for a variable function optical system, the boundary conditions that the variable function optical system are to achieve are considered. Boundary elements that achieve the boundary conditions, respectively, are determined. The boundary elements may have respective surfaces that are freeform, that have radial symmetry, that are planar, or any combination thereof. The boundary elements are not required to be inverses of each other. That is, the boundary thickness variation of one boundary element is not required to be the negative of the boundary thickness variation of the other boundary element.

Figure 6:
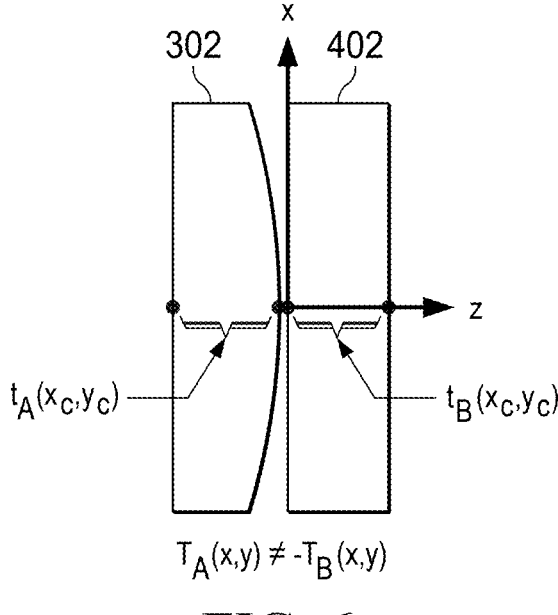
FIG. 6 shows boundary elements for consideration for a variable function optical system according to some examples.

FIG. 6 shows the boundary elements 302, 402 for consideration for a variable function optical system. The boundary thickness variations $T_A(x,y)$, $T_B(x,y)$ of the boundary elements 302, 402, respectively, are determined. The boundary elements 302, 402 have thicknesses $t_A(x,y)$, $t_B(x,y)$ that are determined based on the respective boundary conditions. The first boundary thickness variation $T_A(x,y)$ is the thickness $t_A(x,y)$ at a point (x,y) minus the thickness $t_A(x_c,y_c)$ at the origin (e.g., center) point $(x_c,y_c)$. The second boundary thickness variation $T_B(x,y)$ is the negative of the thickness $t_B(x,y)$ at a point (x,y) minus the thickness $t_B(x_c,y_c)$ at the origin (e.g., center) point $(x_c,y_c)$. The boundary thickness variations $T_A(x,y)$, $T_B(x,y)$ may be determined as shown below in Equations (2) and (3).

$$T_A(x,y)=t_A(x,y)-t_A(x_c,y_c) \qquad \text{Eq. (2)}$$

$$T_B(x,y)=-[t_B(x,y)-t_B(x_c,y_c)] \qquad \text{Eq. (3)}$$

As shown in FIG. 6, facing surfaces of the boundary elements 302, 402 are not inverses of each other. That is, $T_A(x,y) \neq -T_B(x,y)$. FIG. 6 further shows the thicknesses $t_A(x_c, y_c)$, $t_B(x_c, y_c)$ at the origin (e.g., center) point $(x_c, y_c)$ of the boundary elements 302, 402. Due to the boundary elements 302, 402 not being inverses, the thicknesses $t_A(x_c, y_c)$, $t_B(x_c, y_c)$ at the origin (e.g., center) point $(x_c, y_c)$ may or may not be equal.

An average thickness variation $T_{avg}(x,y)$ is extracted from the boundary thickness variations $T_A(x,y)$, $T_B(x,y)$ to obtain extracted thickness variations $T_{A'}(x,y)$, $T_{B'}(x,y)$. The average thickness variation $T_{avg}(x,y)$ is the sum of the boundary thickness variations $T_A(x,y)$, $T_B(x,y)$ divided by two, as shown in Equation (4) below. Equations (5) and (6) below show the extraction of the average thickness variation $T_{avg}(x,y)$ from the boundary thickness variations $T_A(x,y)$, $T_B(x,y)$ to obtain the extracted thickness variations $T_{A'}(x,y)$, $T_{B'}(x,y)$.

$$T_{avg}(x, y) = \frac{T_A(x, y) + T_B(x, y)}{2} \qquad \text{Eq. (4)}$$

$$T_{A'}(x, y) = T_A(x, y) - T_{avg}(x, y) = +\frac{T_A(x, y) - T_B(x, y)}{2} \qquad \text{Eq. (5)}$$

$$T_{B'}(x, y) = T_B(x, y) - T_{avg}(x, y) = -\frac{T_A(x, y) - T_B(x, y)}{2} \qquad \text{Eq. (6)}$$

As illustrated by Equations (5) and (6), the extracted thickness variations $T_{A'}(x,y)$, $T_{B'}(x,y)$ are inverses, that is, $T_{A'}(x,y) = -T_{B'}(x,y)$.

Figure 7:
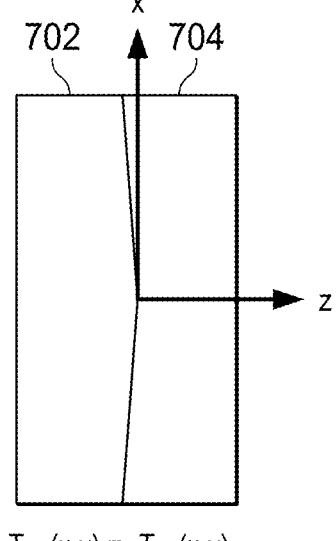
FIG. 7 shows conceptually extracted optically transmissive elements according to some examples.

FIG. 7 shows conceptually a first extracted optically transmissive element 702 and a second extracted optically transmissive element 704. The first extracted optically transmissive element 702 has been extracted from the first boundary element 302 and has a first extracted thickness variation $T_{A'}(x,y)$. The second extracted optically transmissive element 704 has been extracted from the second boundary element 402 and has a second extracted thickness variation $T_{B'}(x,y)$. As shown in FIG. 7, the extracted optically transmissive elements 702, 704 are inverses of each other.

With the extracted thickness variations $T_{A'}(x,y)$, $T_{B'}(x,y)$ being inverses, an integration method can be implemented to obtain transformed thickness variations $T_{F_1}(x,y)$, $T_{F_2}(x,y)$. In an integration method, concepts of optical path difference and wavefront deformation underlie calculations. An optical path difference $OPD(x,y)$ resulting from light passing through a given optically transmissive element having a thickness variation $T(x,y)$ and refractive index n can be calculated as shown in Equation (7) below.

$$OPD(x,y) = (n-1)T(x,y) \qquad \text{Eq. (7)}$$

Equation (7) assumes that the optically transmissive element of refractive index n is surrounded by air, which has a refractive index of approximately 1. If an optically transmissive element is assumed to be surrounded by a material of refractive index n0, then Equation (7) would have $(n-n0)$ rather than $(n-1)$. Other equations derived based on Equation (7) may be altered if an optically transmissive element is to be surrounded by a material other than air. In a two optically transmissive element system, when the optically transmissive elements are inverses (e.g., a first thickness variation is equal to a negative second thickness variation $T(x,y) = T_1(x,y) = -T_2(x,y))$ and are translated opposing lateral shifts a, wavefront deformation $W(x,y)$ may be calculated as shown in Equation (8) below.

$$W(x, y) = (n-1)[T(x+a, y) - T(x-a, y)] \qquad \text{Eq. (8)}$$

$$= 2a(n-1)\frac{[T(x+a, y) - T(x-a, y)]}{2a} \approx 2a(n-1)\frac{\partial T(x, y)}{\partial x}$$

The lateral shifts a in Equation (8) are assumed to be parallel to the x-axis. In other derivations, the lateral shifts a may be in other directions with appropriate changes to various equations and integrals. Viewing the wavefront deformation $W(x,y)$ based on a single, composite optically transmissive element, the thickness variation $T(x,y)$ may be calculated by equating the optical path difference $OPD(x,y)$ (based on the composite thickness variation $T_C(x,y)$) to the wavefront deformation $W(x,y)$, as shown below.

$$2a(n-1)\frac{\partial T(x, y)}{\partial x} = (n-1)T_C(x, y) \qquad \text{Eq. (9)}$$

$$T(x, y) = \frac{1}{2a}\int T_C(x, y)dx \qquad \text{Eq. (10)}$$

Based on the foregoing observations, transformed thickness variations $T_{F_1}(x,y)$, $T_{F_2}(x,y)$ are obtained by integrating the first or second extracted thickness variation $T_{A'}(x,y)$ or $T_{B'}(x,y)$. The inverse nature of the extracted thickness variations $T_{A'}(x,y)$, $T_{B'}(x,y)$ allows either or both to be used in this calculation. Substituting Equation (5) or (6) for the first or second extracted thickness variation $T_{A'}(x,y)$ or $T_{B'}(x,y)$, a difference of the first boundary thickness variation $T_A(x,y)$ minus the second boundary thickness variation $T_B(x,y)$ is integrated, and the integrated result is multiplied (or divided) by an appropriate amount, which is shown to be multiplied by $$\frac{1}{2(2a_{max})}.$$

Equation (11) below shows this calculation.

$$T_{F_1'}(x, y) = -T_{F_2'}(x, y) = \qquad \text{Eq. (11)}$$

$$\frac{1}{2a_{max}}\int T_{A'}(x, y)dx = \frac{1}{2a_{max}}\int \frac{T_A(x, y) - T_B(x, y)}{2}dx$$

Figure 8:
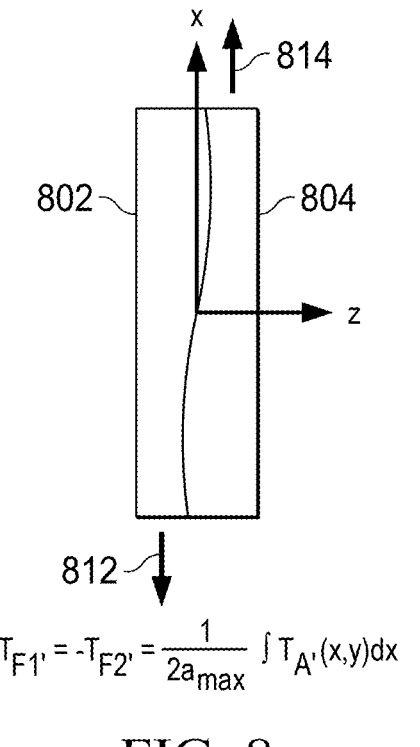
FIG. 8 shows conceptually transformed optically transmissive elements according to some examples.

FIG. 8 shows conceptually a first transformed optically transmissive element 802 and a second transformed optically transmissive element 804. The first transformed optically transmissive element 802 has a first transformed thickness variation $T_{F_1}(x,y)$ that has been calculated based on the first or second extracted thickness variation $T_{A'}(x,y)$ or $T_{B'}(x,y)$, which is further based on the boundary thickness variations $T_A(x,y)$, $T_B(x,y)$. The second transformed optically transmissive element 804 has a second transformed thickness variation $T_{F_2}(x,y)$ that has also been calculated based on the first or second extracted thickness variation $T_{A'}(x,y)$ or $T_{B'}(x,y)$, which is further based on the boundary thickness variations $T_A(x,y)$, $T_B(x,y)$. A positive maximum lateral shift $+|a_{max}|$ 812 is shown for the first transformed optically transmissive element 802, and a negative maximum lateral shift $-|a_{max}|$ 814 is shown for the second transformed optically transmissive element 804. As shown in FIG. 8, the transformed optically transmissive elements 802, 804 are inverses of each other.

With the transformed thickness variations $T_{F_1}(x,y)$, $T_{F_2}(x,y)$, the functional thickness variations $T_{F_1}(x,y)$, $T_{F_2}(x,y)$ of the functional optically transmissive elements of the variable function optical system can be determined. The functional thickness variations $T_{F_1}(x,y)$, $T_{F_2}(x,y)$ are determined by adding half of the average thickness variation $T_{avg}(x,y)$ to the transformed thickness variations $T_{F_1}(x,y)$, $T_{F_2}(x,y)$, respectively. Further, a tilt term $D_x$ may be included to reduce thicknesses of the functional optically transmissive elements. The tilt term $D_x$ may reduce surface depth modulations concurrently for dissimilar functional optically transmissive elements. Equations (12) and (13) illustrate these calculations, with the tilt term $D_x$ included.

$$T_{F_1}(x, y) = T_{F_1'}(x, y) + \frac{T_{avg}(x, y)}{2} + D_x \qquad \text{Eq. (12)}$$

$$= \frac{1}{2a_{max}} \int \frac{T_A(x, y) - T_B(x, y)}{2} dx + \frac{T_A(x, y) + T_B(x, y)}{4} + D_x$$

$$T_{F_2}(x, y) = T_{F_2'}(x, y) + \frac{T_{avg}(x, y)}{2} - D_x \qquad \text{Eq. (13)}$$

$$= -\frac{1}{2a_{max}} \int \frac{T_A(x, y) - T_B(x, y)}{2} dx + \frac{T_A(x, y) + T_B(x, y)}{4} - D_x$$

As shown by Equations (12) and (13), each of the first functional thickness variation $T_{F_1}(x,y)$ and the second functional thickness variation $T_{F_2}(x,y)$ is determined as a sum of (i) a first term that is based on an integration of a difference of the first boundary thickness variation $T_A(x,y)$ minus the second boundary thickness variation $$T_B(x, y) \left( e.g., \pm \frac{1}{2a_{max}} \int \frac{T_A(x, y) - T_B(x, y)}{2} dx \right),$$

(ii) a second term that is based on an average thickness variation $T_{avg}(x,y)$ of the boundary thickness variations $T_A(x,y)$, $T_B(x,y)$ (e.g., $$\frac{T_{avg}(x, y)}{2} \text{ or } \frac{T_A(x, y) + T_B(x, y)}{4} \right),$$

and (iii) a tilt term (e.g., $\pm D_x$).

To test these derivations, a wavefront deformation may be calculated when the functional optically transmissive elements having the functional thickness variations $T_{F_1}(x,y)$, $T_{F_2}(x,y)$ are translated to maximum lateral shifts $+|a_{max}|$, $-|a_{max}|$. The following proof is for a first test case in which the functional optically transmissive elements corresponding to the functional thickness variations $T_{F_1}(x,y)$, $T_{F_2}(x,y)$ are translated to a positive maximum lateral shift $+|a_{max}|$.

$$W(x, y) = (n - 1)\left[ T_{F_1}(x + a_{max}, y) - T_{F_2}(x - a_{max}, y) \right]$$

$$= (n - 1)\left[ \frac{1}{2a_{max}} \int \frac{T_A(x + a_{max}, y) - T_B(x - a_{max}, y)}{2} dx + \right.$$

$$\frac{T_A(x + a_{max}, y) + T_B(x - a_{max}, y)}{4} -$$

-continued $$\frac{1}{2a_{max}} \int \frac{T_A(x + a_{max}, y) + T_B(x - a_{max}, y)}{2} dx +$$

$$\left. \frac{T_A(x + a_{max}, y) + T_B(x - a_{max}, y)}{4} \right]$$

Rearranging the linear terms results in:

$$W(x, y) = (n - 1)\left[ \frac{1}{2} \int \frac{T_A(x + a_{max}, y) - T_A(x - a_{max}, y)}{2a_{max}} dx - \right.$$

$$\frac{1}{2} \int \frac{T_B(x + a_{max}, y) - T_B(x - a_{max}, y)}{2a_{max}} dx +$$

$$\frac{T_A(x + a_{max}, y) + T_A(x - a_{max}, y)}{4} +$$

$$\left. \frac{T_B(x + a_{max}, y) + T_B(x - a_{max}, y)}{4} \right]$$

Based on the observations that (i)

$$\frac{T(x + a, y) - T(x - a, y)}{2a} \approx \frac{\partial T(x, y)}{\partial x}$$

such that $$\int \frac{T(x + a, y) - T(x - a, y)}{2a} dx \approx T(x, y) \text{ and}$$

$$T_A(x - a, y) + T_A(x + a, y) \approx 2T_A(x, y) \qquad \text{(ii)}$$

result in the following:

$$W(x, y) \approx (n - 1)\left[ \frac{T_A(x, y)}{2} - \frac{T_B(x, y)}{2} + \frac{T_A(x, y)}{2} + \frac{T_B(x, y)}{2} \right]$$

$$\approx (n - 1)T_A(x, y) \approx W_A(x, y)$$

Based on the foregoing proof, the wavefront deformation may be directed by the first boundary thickness variation $T_A(x,y)$ of the first boundary element 302 when the functional optically transmissive elements corresponding to the functional thickness variations $T_{F_1}(x,y)$, $T_{F_2}(x,y)$ are translated to a positive maximum lateral shift $+|a_{max}|$.

The following proof is for a second test case in which the functional optically transmissive elements corresponding to the functional thickness variations $T_{F_1}(x,y)$, $T_{F_2}(x,y)$ are translated to a negative maximum lateral shift $-|a_{max}|$.

$$W(x, y) = (n - 1)\left[ T_{F_1}(x - a_{max}, y) + T_{F_2}(x + a_{max}, y) \right]$$

$$= (n - 1)\left[ \frac{1}{2a_{max}} \int \frac{T_A(x - a_{max}, y) - T_B(x - a_{max}, y)}{2} dx + \right.$$

$$\frac{T_A(x - a_{max}, y) + T_B(x - a_{max}, y)}{4} -$$

$$\frac{1}{2a_{max}} \int \frac{T_A(x + a_{max}, y) - T_B(x + a_{max}, y)}{2} dx +$$

$$\left. \frac{T_A(x + a_{max}, y) + T_B(x + a_{max}, y)}{4} \right]$$

$$= (n - 1)\left[ -\frac{1}{2} \int \frac{T_A(x + a_{max}, y) - T_A(x - a_{max}, y)}{2a_{max}} dx + \right.$$

-continued $$\frac{1}{2}\int \frac{T_B(x + a_{max}, y) - T_B(x - a_{max}, y)}{2a_{max}} dx +$$

$$\frac{T_A(x + a_{max}, y) + T_A(x - a_{max}, y)}{4} +$$

$$\frac{T_B(x + a_{max}, y) + T_B(x - a_{max}, y)}{4}\Bigg]$$

$$\approx (n-1)\Bigg[-\frac{T_A(x, y)}{2} + \frac{T_B(x, y)}{2} + \frac{T_A(x, y)}{2} + \frac{T_B(x, y)}{2}\Bigg]$$

$$\approx (n-1)T_B(x, y) \approx W_B(x, y)$$

Based on the foregoing proof, the wavefront deformation may be directed by the second boundary thickness variation $T_B(x,y)$ of the second boundary element 402 when the functional optically transmissive elements corresponding to the functional thickness variations $T_{F_1}(x,y)$, $T_{F_2}(x,y)$ are translated to a negative maximum lateral shift $-|a_{max}|$.

Figure 9:
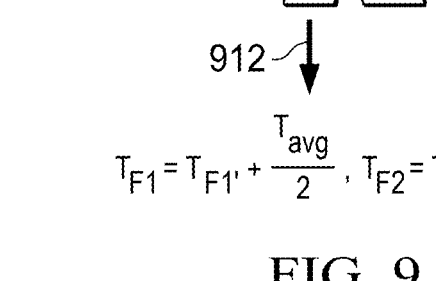
FIG. 9 shows functional optically transmissive elements according to some examples.

FIG. 9 shows a first functional optically transmissive element 902 and a second functional optically transmissive element 904. The first functional optically transmissive element 902 has a first functional thickness variation $T_{F_1}(x, y)$ that has been calculated based on the first transformed thickness variation $T_{F_1}(x,y)$ and the average thickness variation $T_{avg}(x,y)$, each of which is further based on the boundary thickness variations $T_A(x,y)$, $T_B(x,y)$. The second functional optically transmissive element 904 has a second functional thickness variation $T_{F_2}(x,y)$ that has been calculated based on the second transformed thickness variation $T_{F_2}(x,y)$ and the average thickness variation $T_{avg}(x,y)$, each of which is further based on the boundary thickness variations $T_A(x,y)$, $T_B(x,y)$. The first functional optically transmissive element 902 is shown translated 912 a positive maximum lateral shift $+|a_{max}|$, and the second functional optically transmissive element 904 is shown translated 914 a negative maximum lateral shift $-|a_{max}|$. As shown in FIG. 9, the functional optically transmissive elements 902, 904 may possibly not be inverses of each other.

Figure 10:
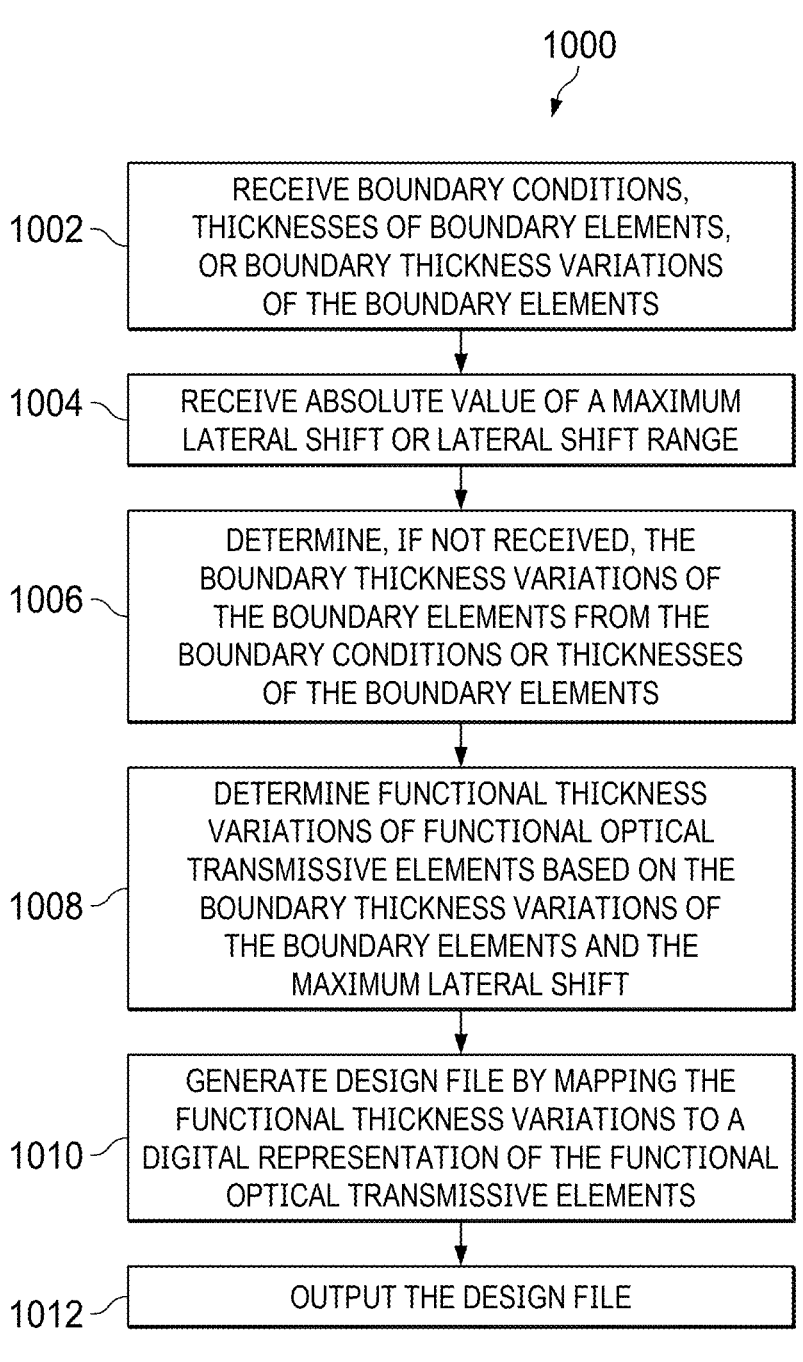
FIG. 10 is a method for generating a design file including digital representations of functional optically transmissive elements for a variable function optical system according to some examples.

FIG. 10 is a method 1000 for generating a design file including digital representations of functional optically transmissive elements for a variable function optical system according to some examples. The method 1000 may be implemented by a processor-based system (e.g., a computer system, such as a server, client device, etc.), examples of which are described subsequently.

At block 1002, boundary conditions, thicknesses of boundary elements, or boundary thickness variations of the boundary elements are received. In various examples, any of the boundary conditions, thicknesses, boundary thickness variations, or any permutation thereof may be received. For example, the boundary conditions 120, 220 of the boundary elements 302, 402 of FIGS. 3 and 4 may be received. As another example, thicknesses $t_A(x,y)$, $t_B(x,y)$ of the boundary elements 302, 402 may be received. As a further example, the boundary thickness variations $T_A(x,y)$, $T_B(x,y)$ of the boundary elements 302, 402 may be received.

At block 1004, an absolute value of a maximum lateral shift $|a_{max}|$ or lateral shift range $|2a_{max}|$ of the functional optically transmissive elements of the variable function optical system is received.

At block 1006, the boundary thickness variations of the boundary elements, if not received at block 1002, are determined from the boundary conditions or thicknesses of the boundary elements. If a boundary condition is received, a thickness $t(x,y)$ of the boundary element may be determined based on the boundary condition. With a thickness $t(x,y)$, a thickness variation $T(x,y)$ may be determined, like in Equation (1). For example, the boundary thickness variations $T_A(x,y)$, $T_B(x,y)$ of the boundary elements 302, 402 may be determined from the thicknesses $t_A(x,y)$, $t_B(x,y)$ of the boundary elements 302, 402, as shown in Equations (2) and (3) above.

At block 1008, functional thickness variations of the functional optically transmissive elements are determined based on the boundary thickness variations of the boundary elements and the maximum lateral shift (or lateral shift range). For example, functional thickness variations $T_{F_1}(x, y)$, $T_{F_2}(x,y)$ of the functional optically transmissive elements of the variable function optical system can be determined as shown in Equations (12) and (13) above. As shown in those equations, each of the functional thickness variations $T_{F_1}(x, y)$, $T_{F_2}(x,y)$ is based on the maximum lateral shift $|a_{max}|$ and both of the boundary thickness variations $T_A(x,y)$, $T_B(x,y)$.

In some examples, the determination of block 1008 may be a direct calculation from the boundary thickness variations $T_A(x,y)$, $T_B(x,y)$ as shown in Equations (12) and (13) above. In other examples, intermediate calculations may be performed to determine the functional thickness variations at block 1008. FIG. 11 illustrates intermediate calculations for the determination of block 1008 according to some examples.

Referring to FIG. 11, at block 1102, an average thickness variation of the boundary thickness variations of the boundary elements is calculated. For example, the average thickness variation $T_{avg}(x,y)$ is calculated from the boundary thickness variations $T_A(x,y)$, $T_B(x,y)$ as shown in Equation (4) above. At block 1104, extracted thickness variations are calculated by extracting the average thickness variation from the boundary thickness variations of the boundary elements. For example, extracted thickness variations $T_A(x,y)$, $T_B(x, y)$ are calculated by extracting the average thickness variation $T_{avg}(x,y)$ from the boundary thickness variations $T_A(x, y)$, $T_B(x,y)$, as shown in Equations (5) and (6) above. At block 1106, transformed thickness variations are calculated, where the calculation includes integrating the extracted thickness variations divided by a lateral shift range. For example, transformed thickness variations $T_{F_1}(x,y)$, $T_{F_2}(x, y)$ are calculated by integrating the first or second extracted thickness variation $T_A(x,y)$ or $T_B(x,y)$, which is divided by two times the maximum lateral shift $|a_{max}|$ (e.g., a lateral shift range from $-|a_{max}|$ to $+|a_{max}|$), as shown in Equation (11) above. At block 1108, the functional thickness variations are calculated by adding half of the average thickness variation to the transformed thickness variations. For example, functional thickness variations $T_{F_1}(x,y)$, $T_{F_2}(x,y)$ are calculated by adding half of the average thickness variation $T_{avg}(x,y)$ to the transformed thickness variations $T_{F_1}(x,y)$, $T_{F_2}(x,y)$ as shown in Equations (12) and (13) above. A tilt term $D_x$ may be included in the functional thickness variations $T_{F_1}(x,y)$, $T_{F_2}(x,y)$. As shown by the derivation of Equations (12) and (13) above, the determination of block 1008 may incorporate implicitly the calculations of FIG. 11. Hence, in some examples, the calculations of FIG. 11 may be explicitly performed, and in other examples, the calculations of FIG. 11 may be implicit in another determination. Various combinations of explicit and implicit calculations may be performed.

Referring back to FIG. 10, at block 1010, a design file is generated by mapping the functional thickness variations to a digital representation of the functional optically transmissive elements. The design file can be a point cloud file, a bitmap file, or another file type. At block 1012, the design file is output. With the design file, functional optically transmissive elements may be manufactured based on the design file, and the manufactured functional optically transmissive elements may thereafter be implemented in a variable function optical system. Hence, the variable function optical system may be manufactured including the manufactured functional optically transmissive elements. The variable function optical system may be operated as described with respect to FIGS. 1 and 2, where the functional optically transmissive elements may be translated to a positive maximum lateral shift to achieve a first boundary condition (like in FIG. 1) and may be translated to a negative maximum lateral shift to achieve a second boundary condition (like in FIG. 2).

As stated previously, the method 1000 may be implemented using an analytical analysis or using a numerical analysis. Case studies for analytical analysis and numerical analysis are provided as examples.

Analytical Example 1

For this example, polycarbonate (n=1.59) is implemented as the material for the functional optically transmissive elements, and 550 nm wavelength for the collimate light was assumed. The boundary elements have circular apertures with 4 mm diameters and 0.75 mm thicknesses at a center point. The system has positive power at a=0 and for all values. Table 1 lists the input parameters and the resulting functional thickness variations of the freeform surfaces of the functional optically transmissive elements that were calculated. The linear tilt term in the functional optically transmissive elements is calculated using MATLAB to reduce the overall sag along the freeform surfaces.

TABLE 1

| Inputs | First boundary element A | Flat with zero optical power, $T_A(x, y) = 0$, $P_A = 0$ |
| | Second boundary element B | $T_B(x, y) = -0.05(x^2 + y^2)$, $P_B = 61$ Diopter |
| | Lateral shift range | $-0.4 < a < +0.4$ mm |
| Outputs | First functional optically transmissive element F1 | $T_{F_1}(x, y) = 0.03125\left(\dfrac{x^3}{3} + xy^2\right) - 0.0125(x^2 + y^2) - 0.0743x$ |
| | Second functional optically transmissive element F2 | $T_{F_2}(x, y) = -0.03125\left(\dfrac{x^3}{3} + xy^2\right) - 0.0125(x^2 + y^2) + 0.0743x$ |

Figure 12A:
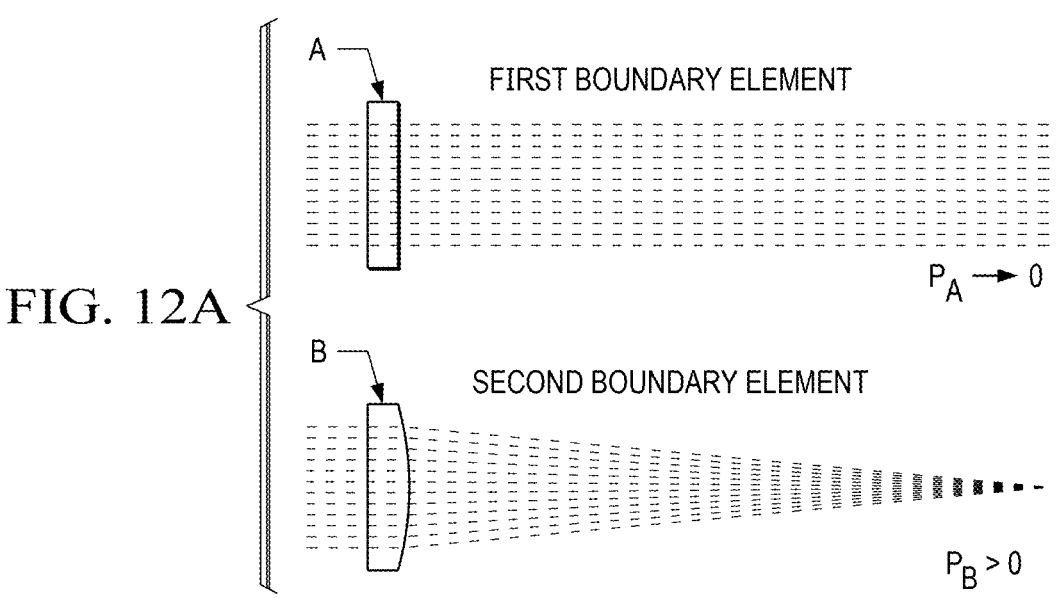
Figure 12B:
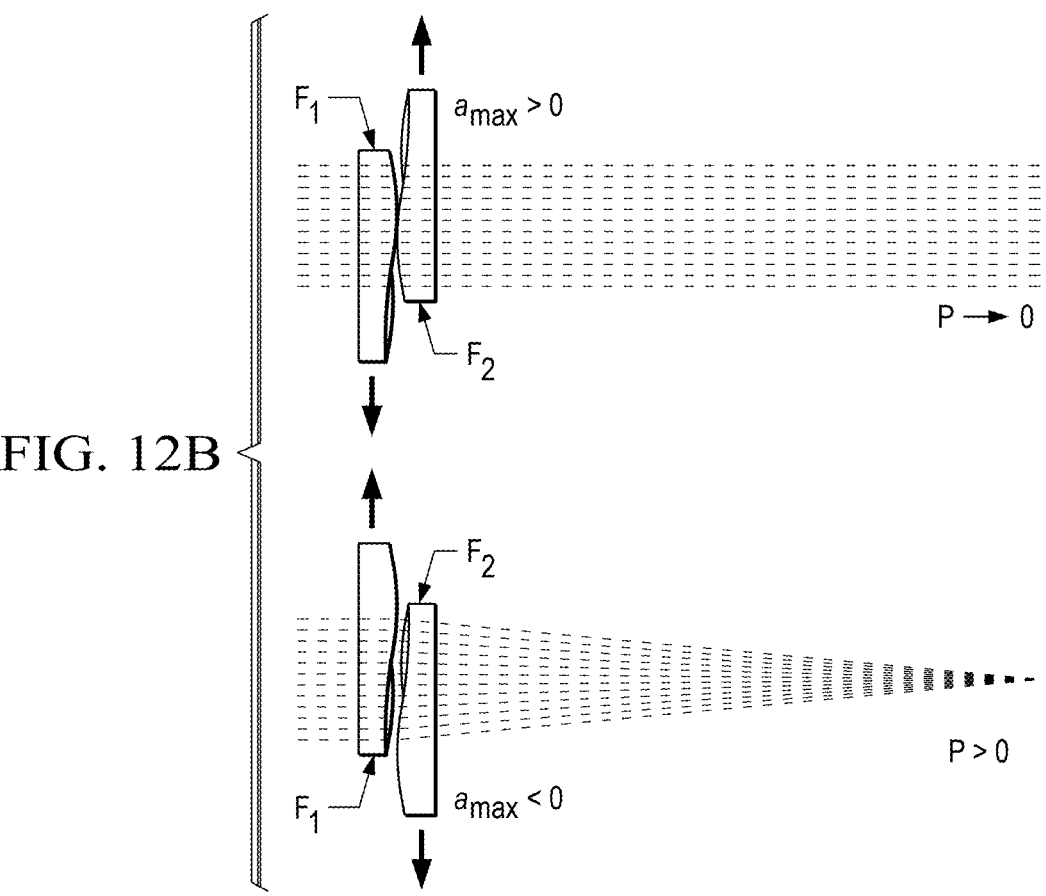
Figure 12C:
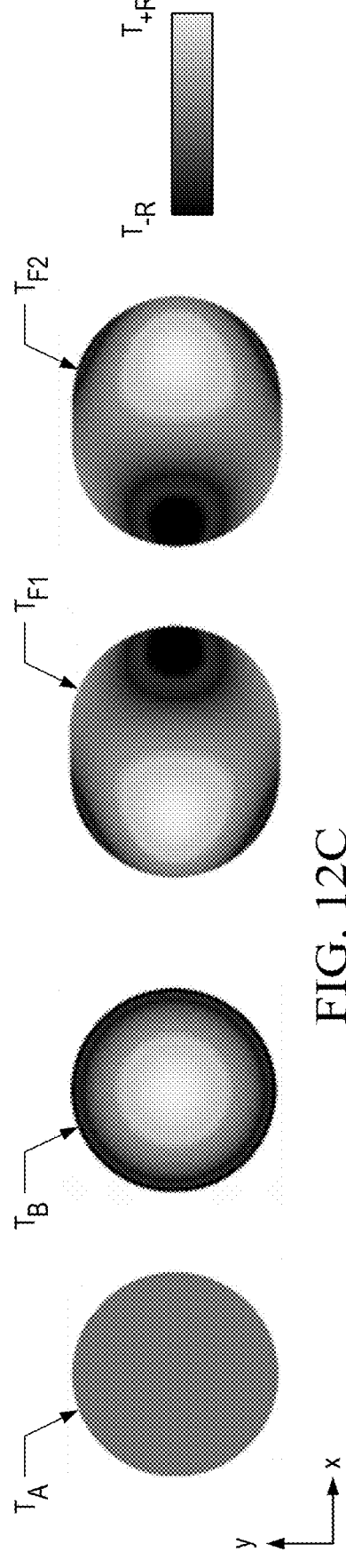

FIG. 12A shows the first and second boundary elements A, B with first and second boundary conditions, respectively. FIG. 12B shows the variable function optical system with the first and second functional optically transmissive elements $F_1$, $F_2$ (i) in a positive maximum lateral shift $a_{max} > 0$ with the resulting first boundary condition and (ii) in a negative maximum lateral shift $a_{max} < 0$ with the resulting second boundary condition. FIG. 12C shows the boundary thickness variations $T_A$, $T_B$ and the functional thickness variations $T_{F_1}$, $T_{F_2}$. These thickness variations are shown in a gradient scale from a negative end of range $T_{-R}$ to a positive end of range $T_{-R}$. The boundary elements and resulting functional optically transmissive elements were modeled using illumination simulation software. A 100 m air gap was set between the first and second functional optically transmissive elements $F_1$, $F_2$ to ensure that they do not contact during shifting. As shown in FIG. 12D, the first and second functional optically transmissive elements $F_1$, $F_2$ delivers variable positive optical power (and focal length) between the boundary values.

Analytical Example 2

The second example demonstrates a variable cylindrical lens system using the described methodology. The same general configuration and design parameters as in the first analytical example are used here, but with different boundary element surface equations and lateral shift range, as shown in Table 2. As before, the equations of the functional optically transmissive elements $F_1$, $F_2$ are calculated, and a linear tilt term is added to reduce the depth modulation.

TABLE 2

| Inputs | First boundary element A | $T_A(x, y) = -0.04x^2$ |
| | Second boundary element B | $T_B(x, y) = -0.04y^2$ |
| | Lateral shift range | $-0.5 < a < +0.5$ mm |
| Outputs | First functional optically transmissive element F1 | $T_{F_1}(x, y) = 0.02\left(xy^2 - \dfrac{x^3}{3}\right) - 0.01(x^2 + y^2) + 0.0084x$ |
| | Second functional optically transmissive element F2 | $T_{F_2}(x, y) = -0.02\left(xy^2 - \dfrac{x^3}{3}\right) - 0.01(x^2 + y^2) - 0.0084x$ |

Figure 13A:
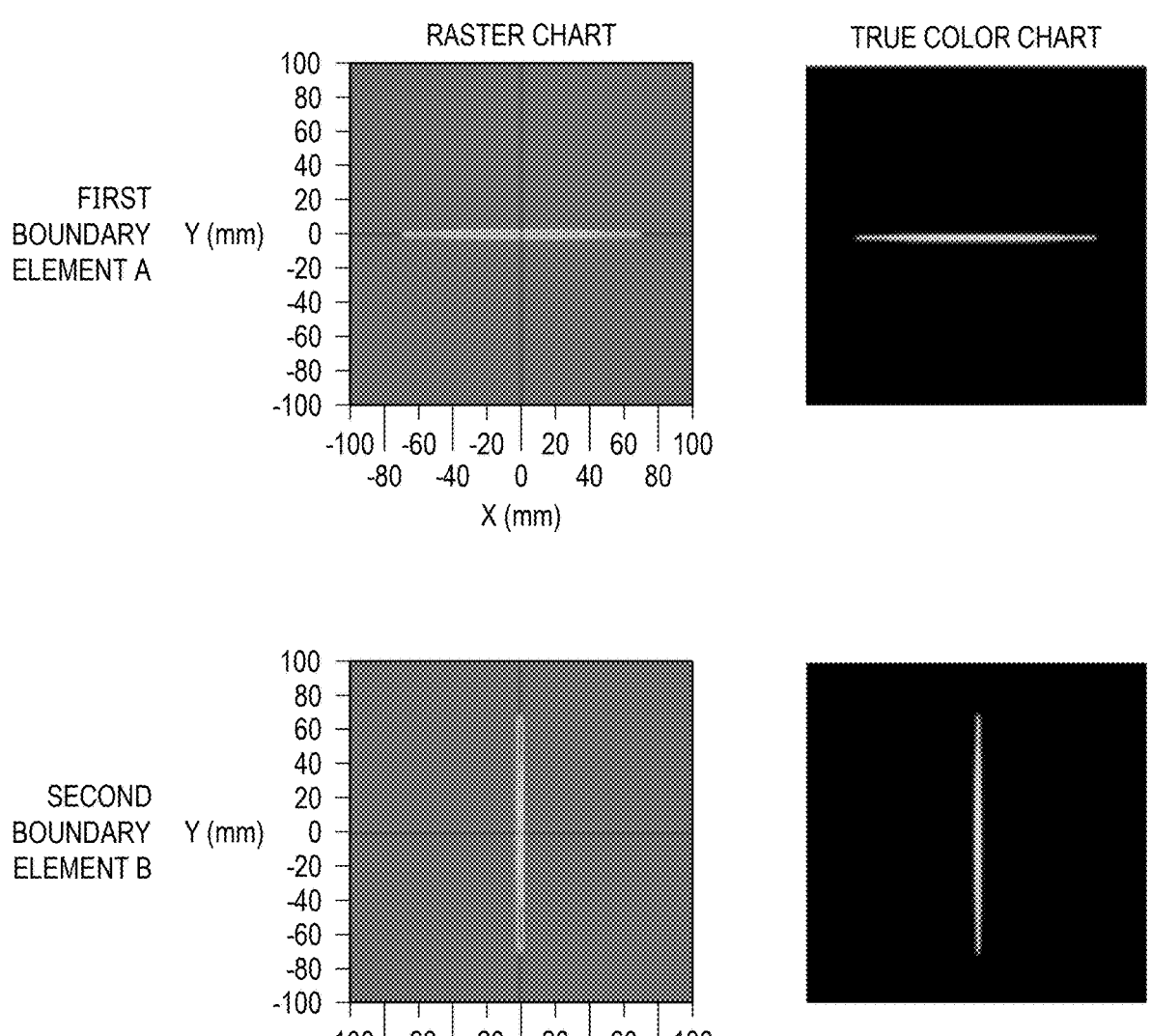
FIGS. 13A, 13B, and 13C illustrate aspects of a second analytical example.
Figures 13B, 13C:
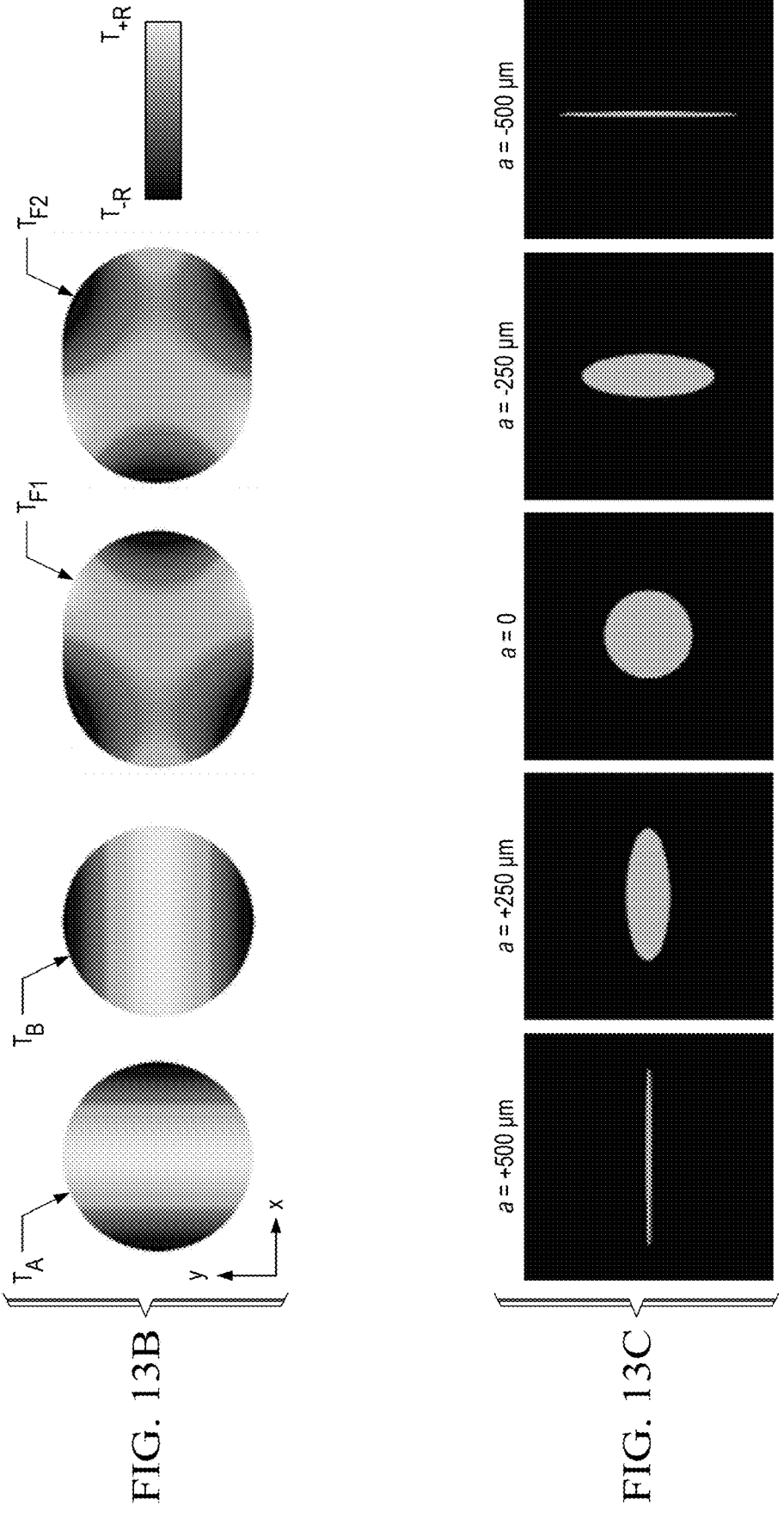

Illumination simulation software was again used to model boundary elements irradiated by a uniform disc source with a diameter of 3 mm. FIG. 13A shows the output irradiances of the simulated boundary elements at 1 m distance in a raster chart and a true color chart. FIG. 13B shows the boundary thickness variations $T_A$, $T_B$ and the functional thickness variations $T_{F_1}$, $T_{F_2}$. These thickness variations are shown in a gradient scale from a negative end of range $T_{-R}$ to a positive end of range $T_{-R}$. FIG. 13C illustrates the change of output irradiance with various shifts (a=+500 μm, a=+250 μm, a=0 μm, a=−250 μm, a=−500 μm) between the functional optically transmissive elements.

Analytical Example 3

Figure 14A:
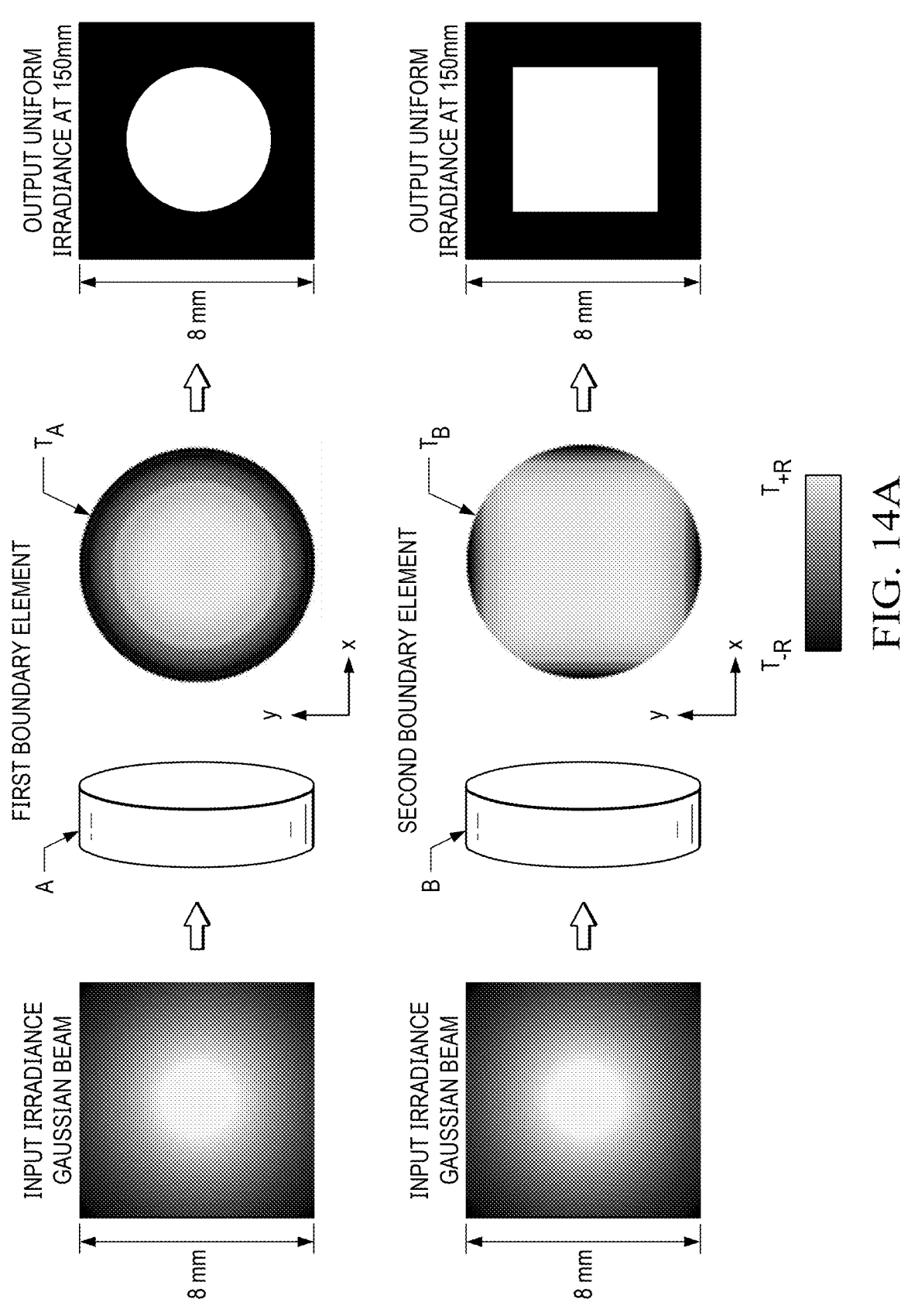
FIGS. 14A and 14B illustrate aspects of a third analytical example.

This example develops a dynamic beam shaper that converts a circular Gaussian input beam from a uniform circular output pattern to a uniform square output pattern. As illustrated in FIG. 14A, the first boundary element A produces a uniform circular shape of irradiance output from a Gaussian incident beam, and the second boundary element B delivers a uniform square shape of irradiance output from a Gaussian incident beam. FIG. 14A also shows the boundary thickness variations $T_A$, $T_B$ of the boundary elements A, B. These thickness variations are shown in a gradient scale from a negative end of range $T_{-R}$ to a positive end of range $T_{+R}$. Table 3 below lists the parameters, and Table 4 lists the thickness variation coefficients of the analytical equations, where $T(x,y)=\Sigma a_{m,n}x^m y^n$.

TABLE 3

| | |
|---|---|
| Wavelength | 632.8 nm |
| Input beam waist diameter | 6 mm |
| Material (index) | PMMA (n = 1.49) |
| Target distance | 150 mm |
| Boundary element diameters | 12 mm |
| Boundary element thickness | 2 mm |
| First boundary output beam diameter | 5 mm |
| Second boundary output beam square side | 5 mm |
| Lateral shift range | −300 < a < +300 μm |

TABLE 4

| Polynomial orders | | Thickness variation coefficients $a_{m,n}(\mathrm{mm}^{1-m-n})$ | | | |
|---|---|---|---|---|---|
| m | n | $T_A$ | $T_B$ | $T_{F1}$ | $T_{F2}$ |
| 1 | 0 | 0 | 0 | 6.25E−02 | −6.25E−02 |
| 2 | 0 | 1.22E−03 | 2.24E−03 | 8.65E−04 | 8.65E−04 |
| 3 | 0 | 0 | 0 | −2.83E−04 | 2.83E−04 |
| 4 | 0 | −2.22E−04 | −3.31E−04 | −1.38E−04 | −1.38E−04 |
| 5 | 0 | 0 | 0 | 1.82E−05 | −1.82E−05 |
| 6 | 0 | 6.81E−06 | 1.39E−05 | 5.18E−06 | 5.18E−06 |
| 7 | 0 | 0 | 0 | −8.44E−07 | 8.44E−07 |
| 8 | 0 | −1.64E−07 | −4.61E−07 | −1.56E−07 | −1.56E−07 |
| 9 | 0 | 0 | 0 | 2.75E−08 | −2.75E−08 |
| 10 | 0 | 2.83E−09 | 1.06E−08 | 3.36E−09 | 3.36E−09 |
| 11 | 0 | 0 | 0 | −5.89E−10 | 5.89E−10 |
| 12 | 0 | −3.06E−11 | −1.45E−10 | −4.39E−11 | −4.39E−11 |
| 13 | 0 | 0 | 0 | 7.33E−12 | −7.33E−12 |
| 14 | 0 | 1.53E−13 | 8.73E−13 | 2.56E−13 | 2.56E−13 |
| 15 | 0 | 0 | 0 | −4.00E−14 | 4.00E−14 |
| 0 | 2 | 1.22E−03 | 2.24E−03 | 8.65E−04 | 8.65E−04 |
| 1 | 2 | 0 | 0 | −8.50E−04 | 8.50E−04 |
| 2 | 2 | −4.44E−04 | 0 | −1.11E−04 | −1.11E−04 |
| 3 | 2 | 0 | 0 | −1.23E−04 | 1.23E−04 |
| 4 | 2 | 2.04E−05 | 0 | 5.11E−06 | 5.11E−06 |
| 5 | 2 | 0 | 0 | 3.40E−06 | −3.40E−06 |

TABLE 4-continued

| Polynomial orders | | Thickness variation coefficients $a_{m,n}(\mathrm{mm}^{1-m-n})$ | | | |
|---|---|---|---|---|---|
| m | n | $T_A$ | $T_B$ | $T_{F1}$ | $T_{F2}$ |
| 6 | 2 | −6.56E−07 | 0 | −1.64E−07 | −1.64E−07 |
| 7 | 2 | 0 | 0 | −7.81E−08 | 7.81E−08 |
| 8 | 2 | 1.42E−08 | 0 | 3.54E−09 | 3.54E−09 |
| 9 | 2 | 0 | 0 | 1.31E−09 | −1.31E−09 |
| 10 | 2 | −1.84E−10 | 0 | −4.59E−11 | −4.59E−11 |
| 11 | 2 | 0 | 0 | −1.39E−11 | 1.39E−11 |
| 12 | 2 | 1.07E−12 | 0 | 2.68E−13 | 2.68E−13 |
| 13 | 2 | 0 | 0 | 6.87E−14 | −6.87E−14 |
| 0 | 4 | −2.22E−04 | −3.31E−04 | −1.38E−04 | −1.38E−04 |
| 1 | 4 | 0 | 0 | 9.08E−05 | −9.08E−05 |
| 2 | 4 | 2.04E−05 | 0 | 5.11E−06 | 5.11E−06 |
| 3 | 4 | 0 | 0 | 5.68E−06 | −5.68E−06 |
| 4 | 4 | −9.84E−07 | 0 | −2.46E−07 | −2.46E−07 |
| 5 | 4 | 0 | 0 | −1.64E−07 | 1.64E−07 |
| 6 | 4 | 2.83E−08 | 0 | 7.07E−09 | 7.07E−09 |
| 7 | 4 | 0 | 0 | 3.37E−09 | −3.37E−09 |
| 8 | 4 | −4.59E−10 | 0 | −1.15E−10 | −1.15E−10 |
| 9 | 4 | 0 | 0 | −4.25E−11 | 4.25E−11 |
| 10 | 4 | 3.21E−12 | 0 | 8.03E−13 | 8.03E−13 |
| 11 | 4 | 0 | 0 | 2.43E−13 | −2.43E−13 |
| 0 | 6 | 6.81E−06 | 1.39E−05 | 5.18E−06 | 5.18E−06 |
| 1 | 6 | 0 | 0 | −5.91E−06 | 5.91E−06 |
| 2 | 6 | −6.56E−07 | 0 | −1.64E−07 | −1.64E−07 |
| 3 | 6 | 0 | 0 | −1.82E−07 | 1.82E−07 |
| 4 | 6 | 2.83E−08 | 0 | 7.07E−09 | 7.07E−09 |
| 5 | 6 | 0 | 0 | 4.72E−09 | −4.72E−09 |
| 6 | 6 | −6.12E−10 | 0 | −1.53E−10 | −1.53E−10 |
| 7 | 6 | 0 | 0 | −7.29E−11 | 7.29E−11 |
| 8 | 6 | 5.36E−12 | 0 | 1.34E−12 | 1.34E−12 |
| 9 | 6 | 0 | 0 | 4.96E−13 | −4.96E−13 |
| 0 | 8 | −1.64E−07 | −4.61E−07 | −1.56E−07 | −1.56E−07 |
| 1 | 8 | 0 | 0 | 2.47E−07 | −2.47E−07 |
| 2 | 8 | 1.42E−08 | 0 | 3.54E−09 | 3.54E−09 |
| 3 | 8 | 0 | 0 | 3.93E−09 | −3.93E−09 |
| 4 | 8 | −4.59E−10 | 0 | −1.15E−10 | −1.15E−10 |
| 5 | 8 | 0 | 0 | −7.65E−11 | 7.65E−11 |
| 6 | 8 | 5.36E−12 | 0 | 1.34E−12 | 1.34E−12 |
| 7 | 8 | 0 | 0 | 6.37E−13 | −6.37E−13 |
| 0 | 10 | 2.83E−09 | 1.06E−08 | 3.36E−09 | 3.36E−09 |
| 1 | 10 | 0 | 0 | −6.47E−09 | 6.47E−09 |
| 2 | 10 | −1.84E−10 | 0 | −4.59E−11 | −4.59E−11 |
| 3 | 10 | 0 | 0 | −5.10E−11 | 5.10E−11 |
| 4 | 10 | 3.21E−12 | 0 | 8.03E−13 | 8.03E−13 |
| 5 | 10 | 0 | 0 | 5.35E−13 | −5.35E−13 |
| 0 | 12 | −3.06E−11 | −1.45E−10 | −4.39E−11 | −4.39E−11 |
| 1 | 12 | 0 | 0 | 9.53E−11 | −9.53E−11 |
| 2 | 12 | 1.07E−12 | 0 | 2.68E−13 | 2.68E−13 |
| 3 | 12 | 0 | 0 | 2.97E−13 | −2.97E−13 |
| 0 | 14 | 1.53E−13 | 8.73E−13 | 2.56E−13 | 2.56E−13 |
| 1 | 14 | 0 | 0 | −6.00E−13 | 6.00E−13 |

Figure 14B:
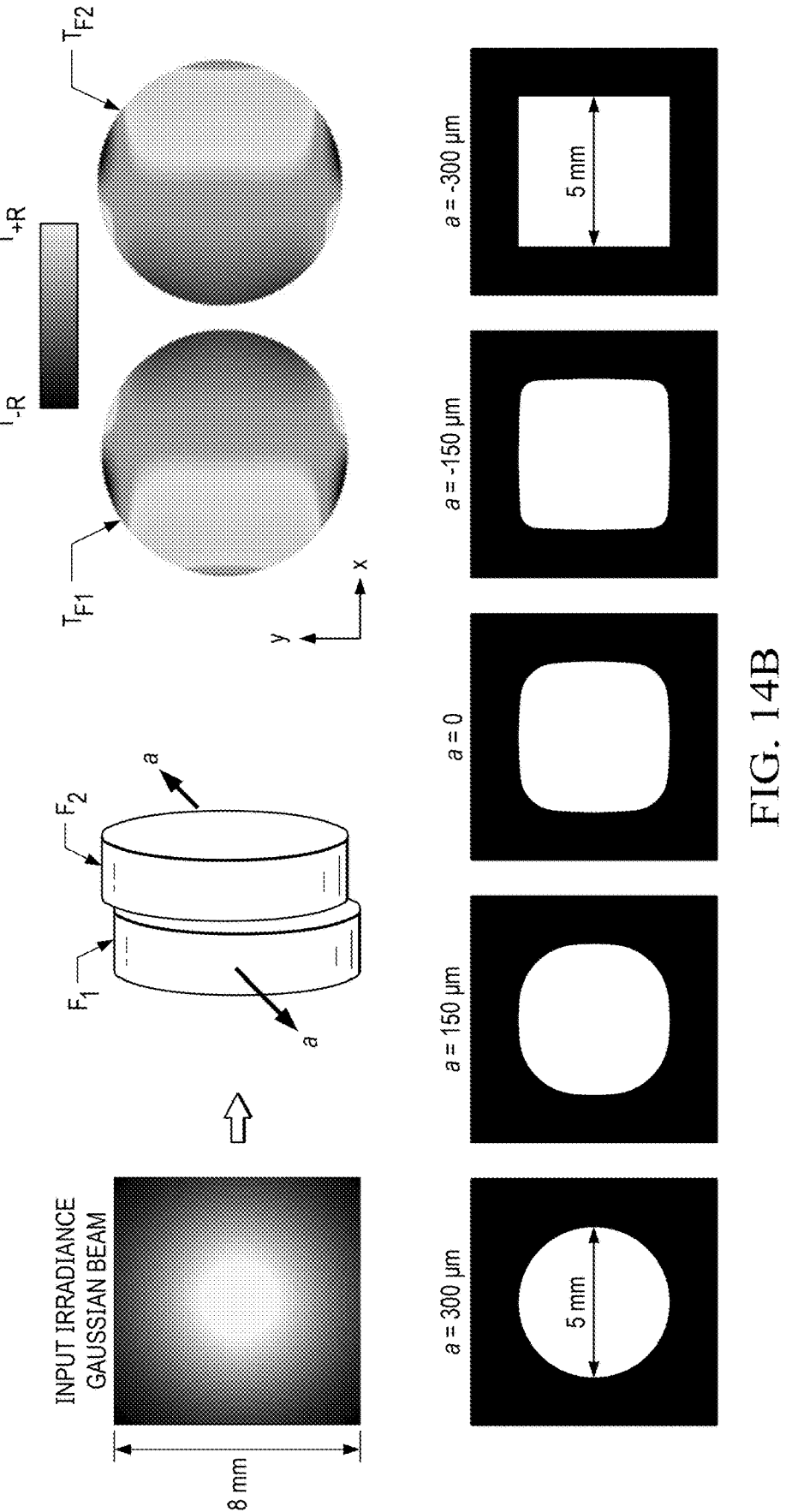

As before, the surface profiles of the functional optically transmissive elements are computed using the boundary element profiles and lateral shift range. The resulting surface equations are listed above in Table 3. The resulting surface equations were then used to model the variable function optical system in VirtualLab Fusion, as shown in FIG. 14B. FIG. 14B shows the variable function optical system with the first and second functional optically transmissive elements $F_1$, $F_2$. FIG. 14B shows the functional thickness variations $T_{F_1}$, $T_{F_2}$. These thickness variations are shown in a gradient scale from a negative end of range $T_{-R}$ to a positive end of range $T_{+R}$. FIG. 14B illustrates the change of output irradiance with various shifts (a=+300 μm, a=+150 μm, a=0 μm, a=−150 μm, a=−300 μm) between the functional optically transmissive elements $F_1$, $F_2$. The surfaces in this example are much more complex than the first two analytical examples, illustrating the power and flexibility of the methodology.

Numerical Example 1

The trapezoidal rule may be used for performing numerical integration in the numerical examples. To simplify calculations, the integration dimension may be reduced from 3D to 2D by discretizing the function along the Y axis and moving from an XYZ space to XZ planes. The cumulative integration for x with respect to zero may be used at each XZ plane using the MATLAB "Cumtrapz" function. The accuracy of the numerical integration can be improved by increasing the number of surface points, but at the cost of increased computation time.

The boundary elements for this example are built from the first analytical example, as listed in Table 1. The point clouds of boundary elements were generated in MATLAB with 0.05 mm resolution. By taking the boundary thickness variation of the surface points and a maximum lateral shift of 0.4 mm, surface points of the functional optically transmissive elements were numerically generated in MATLAB. The numerical integration approach discussed above was implemented. The MATLAB code was linked to illumination simulation software to increase analysis of the system's optical performance. FIG. 15 illustrates construction of the desired geometry of a functional optically transmissive element in the illumination simulation software to match the geometry of the first analytical example. FIG. 15 shows a point cloud 1502 construction of a first functional optically transmissive element $F_1$, a 3D model 1504 of the point cloud 1502, the intersection 1506 of the first functional optically transmissive element $F_1$ based on the target aperture geometry, and the resulting first functional optically transmissive element $F_1$.

The optical power of the variable function optical system was determined as the inverse of the back focal length at different lateral shifts using a parameter analyzer in illumination simulation software. The results obtained are generally in agreement with the analytic results of the first analytical example. Table 5 compares the values obtained using the analytic and numerical approaches. The differences increase slightly as the lateral shift is increased from zero to the positive maximum lateral shift. In the case of maximum positive lateral shift, the focal point expands to infinity, making the system sensitive to lateral shift and resulting in a larger difference.

TABLE 5

| | Lateral Shift (α) in mm | | | | | | | | |
|---|---|---|---|---|---|---|---|---|---|
| | 0.399 | 0.3 | 0.2 | 0.1 | 0 | −0.1 | −0.2 | −0.3 | −0.4 |
| Power— Analytic (Diopters) | 0.51 | 7.4 | 14.8 | 22.4 | 29.9 | 37.6 | 45.3 | 53.1 | 61.0 |
| Power— Numerical (Diopters) | 0.52 | 7.6 | 15.0 | 22.6 | 30.2 | 37.8 | 45.6 | 53.4 | 61.4 |
| Percent Difference | 1.9 | 2.7 | 1.3 | 0.9 | 0.7 | 0.7 | 0.6 | 0.6 | 0.7 |

Numerical Example 2

In this example, a freeform design module of illumination simulation software was used to create the boundary elements assuming the uniform plane wave source. In this example, a numerical analysis for a dynamic pattern generator changing the irradiance distribution between square and hexagonal target patterns is achieved.

Figure 16A:
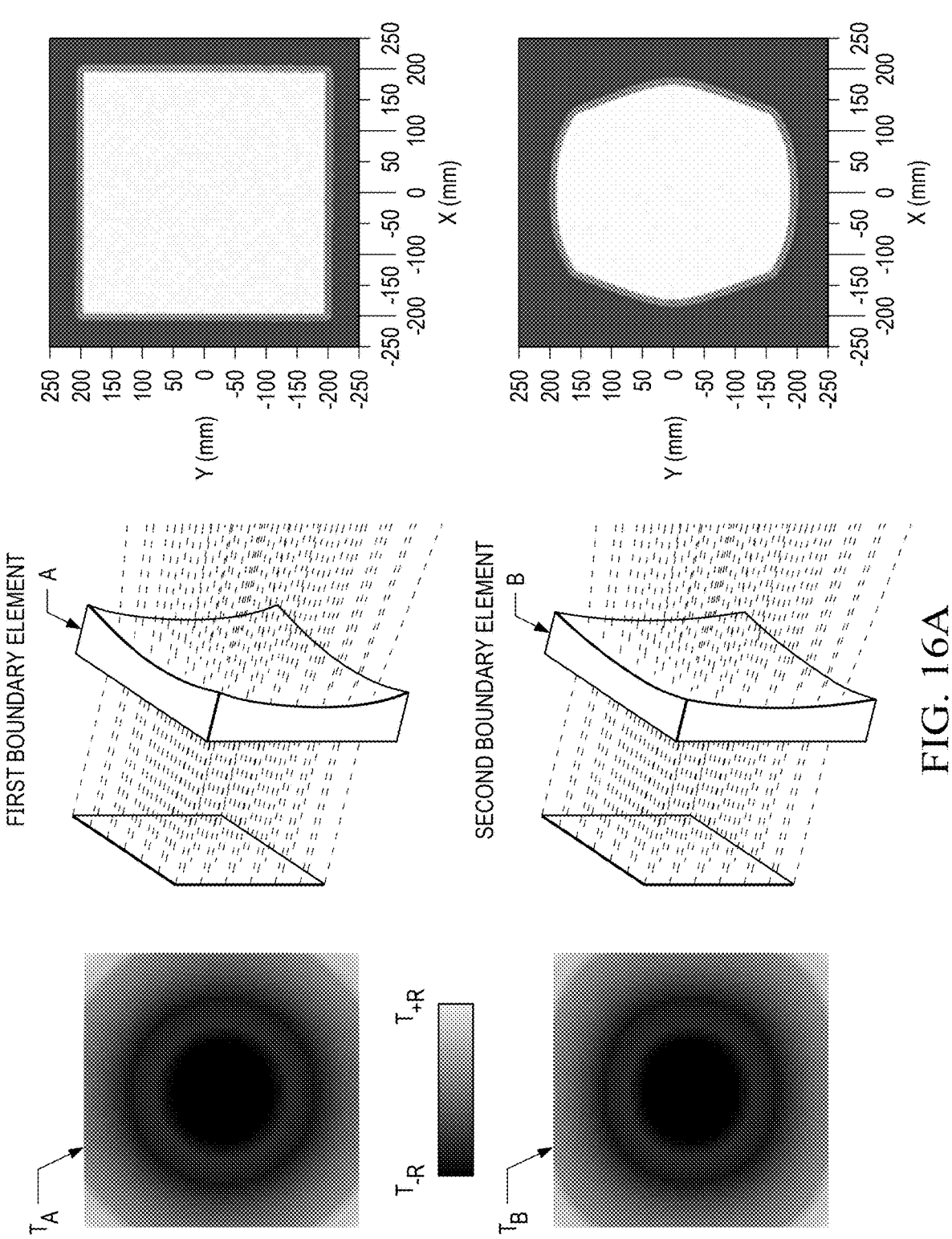
FIGS. 16A and 16B illustrate aspects of a second numerical example.

The mesh grids of the resulting freeform surfaces were adjusted to uniform XY grids for compatibility with custom MATLAB code developed to calculate the thickness variations of dynamic freeform plates. The boundary elements are 5×5 mm with 0.75 mm thickness and a 4×4 mm uniform source. The material and wavelength are PMMA and 550 nm, respectively. FIG. 16A also shows the boundary thickness variations $T_A$, $T_B$ of the boundary elements A, B. These thickness variations are shown in a gradient scale from a negative end of range $T_{-R}$ to a positive end of range $T_{+R}$. FIG. 16A also shows the irradiance patterns of the boundary conditions for the boundary elements A, B. The two boundary elements A, B were constructed in illumination simulation software, and the resulting illumination patterns are shown 2 m from the first element interface.

Figure 16B:
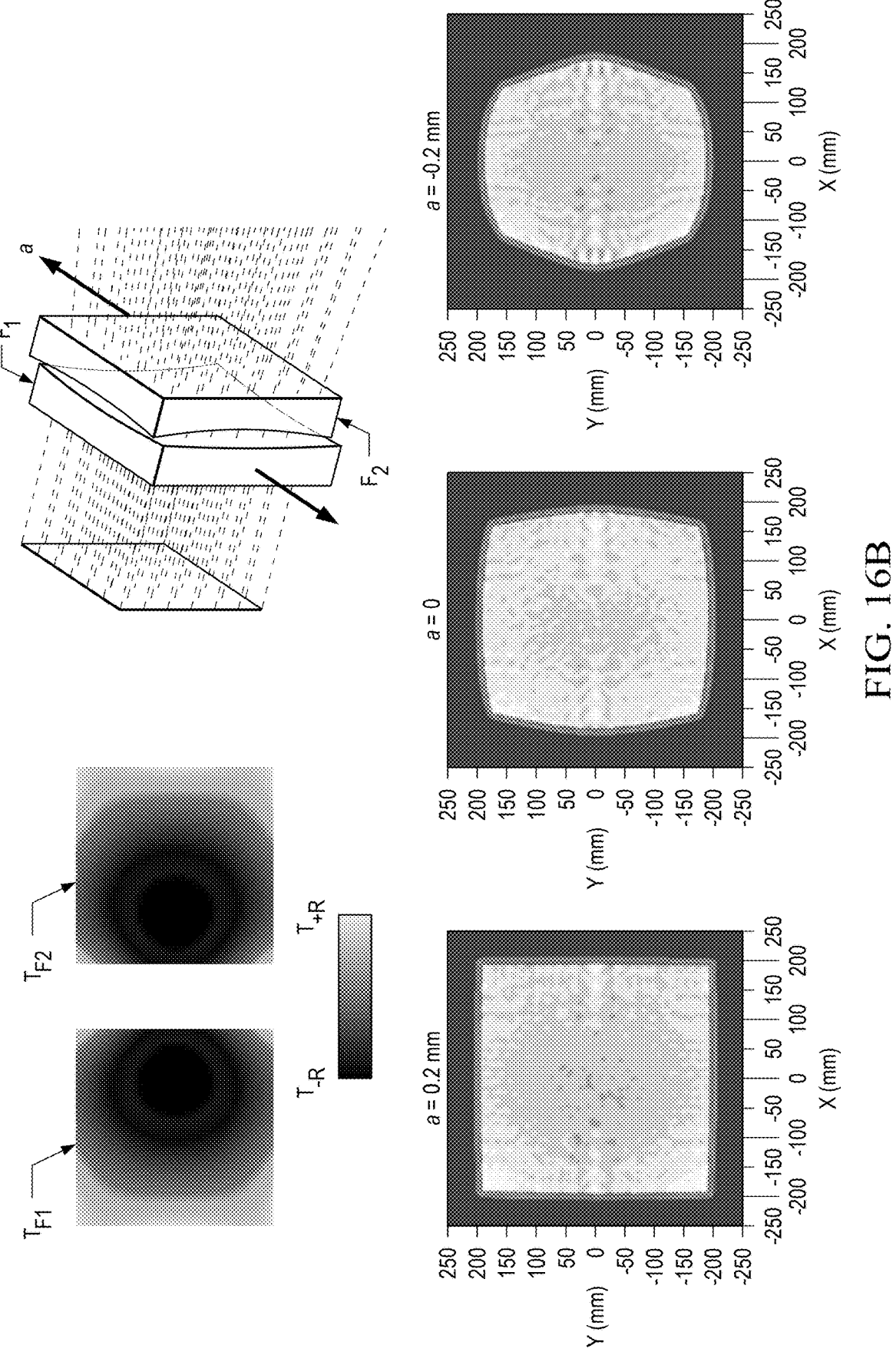

As in the previous example, the MATLAB code was linked to illumination simulation software to import the surface height maps from the two boundary elements to accelerate the process. Dynamic freeform point clouds were numerically calculated in MATLAB considering 200 by 200 mesh grids over the 5×5 mm mesh extent with a maximum lateral shift of 0.2 mm. The resulting points were transferred to illumination simulation software for optical performance evaluation as illustrated in FIG. 16B. FIG. 16B shows the variable function optical system with the first and second functional optically transmissive elements $F_1$, $F_2$. FIG. 16B shows the functional thickness variations $T_{F_1}$, $T_{F_2}$. These thickness variations are shown in a gradient scale from a negative end of range $T_{-R}$ to a positive end of range $T_{+R}$. FIG. 16B illustrates the change of output irradiance with various shifts (a=+0.2 mm, a=0 mm, a=−0.2 mm) between the functional optically transmissive elements $F_1$, $F_2$. The aperture size and thicknesses of the functional optically transmissive elements were assumed to be the same as the boundary elements. A 500 m air gap was set between the functional optically transmissive elements to avoid collision during shifting.

Numerical Example 3

Figures 1, 17A:
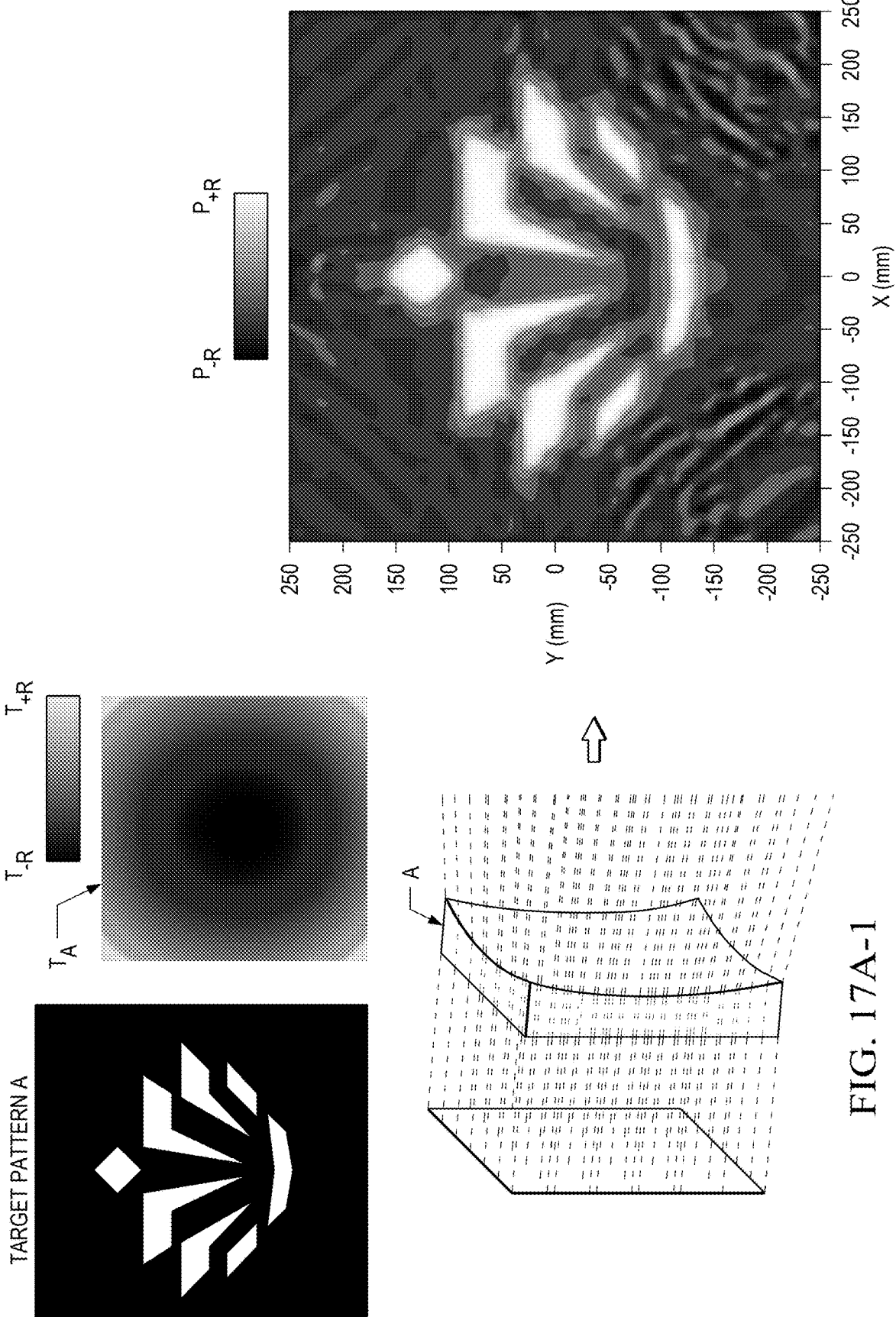
Figures 2, 17A:
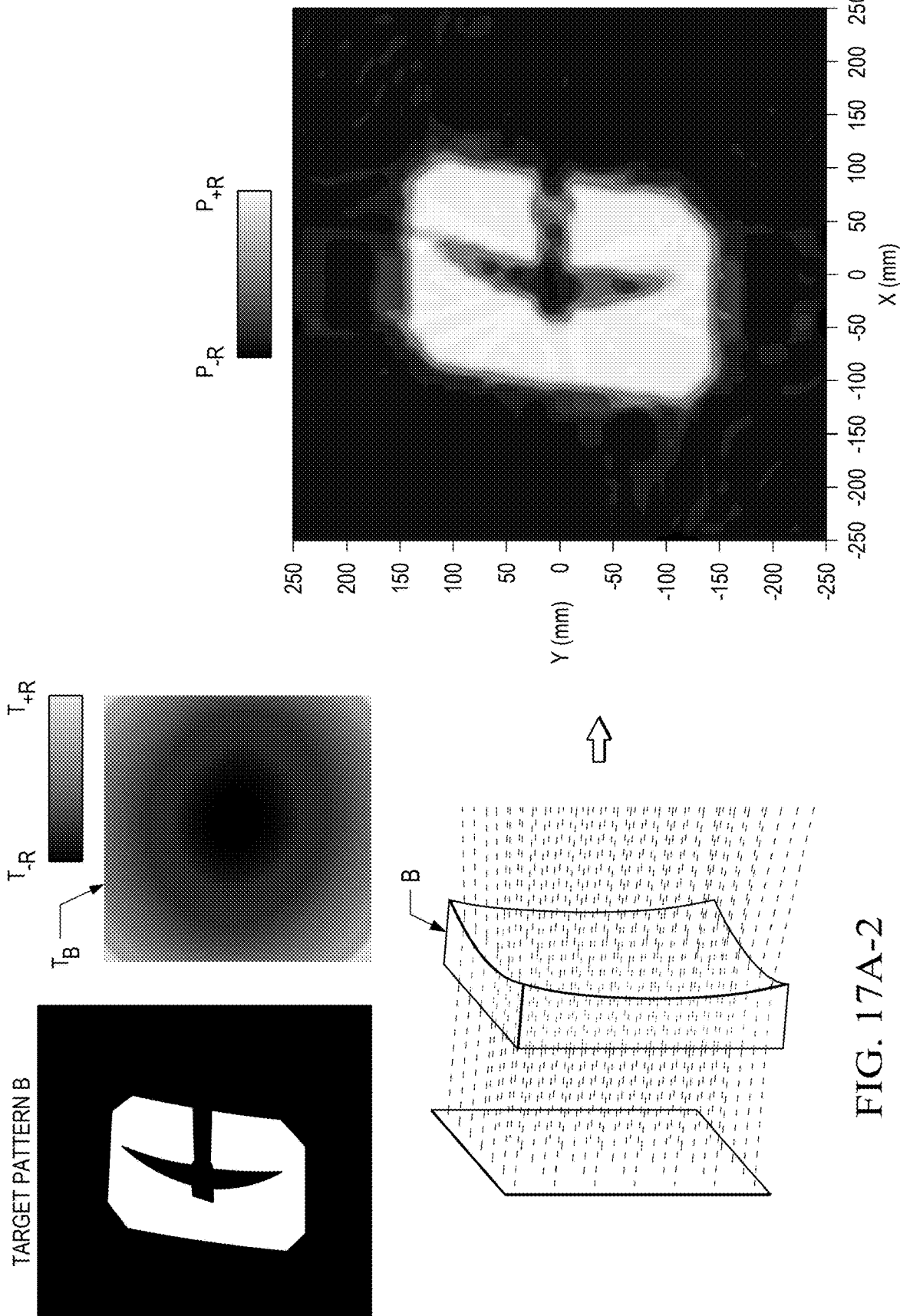

The results obtained from the previous example could arguably be achieved using analytic representations of the target patterns. For this reason, we repeated the process with the same parameters but for significantly more complex target patterns that are not feasible to represent in analytic form. The two boundary elements were again constructed using the freeform design module of illumination simulation software assuming uniform plane wave sources. Target patterns, the boundary thickness variations $T_A$, $T_B$ of the boundary elements A, B, the boundary elements A, B, and the irradiance patterns of the boundary conditions for the boundary elements A, B are shown in FIGS. 17A-1 and 17A-2. The thickness variations are shown in a gradient scale from a negative end of range $T_{-R}$ to a positive end of range $T_{+R}$, as is the power of the irradiance patterns from a negative end of range $P_{-R}$ to a positive end of range $P_{+R}$.

Figures 1, 17B:
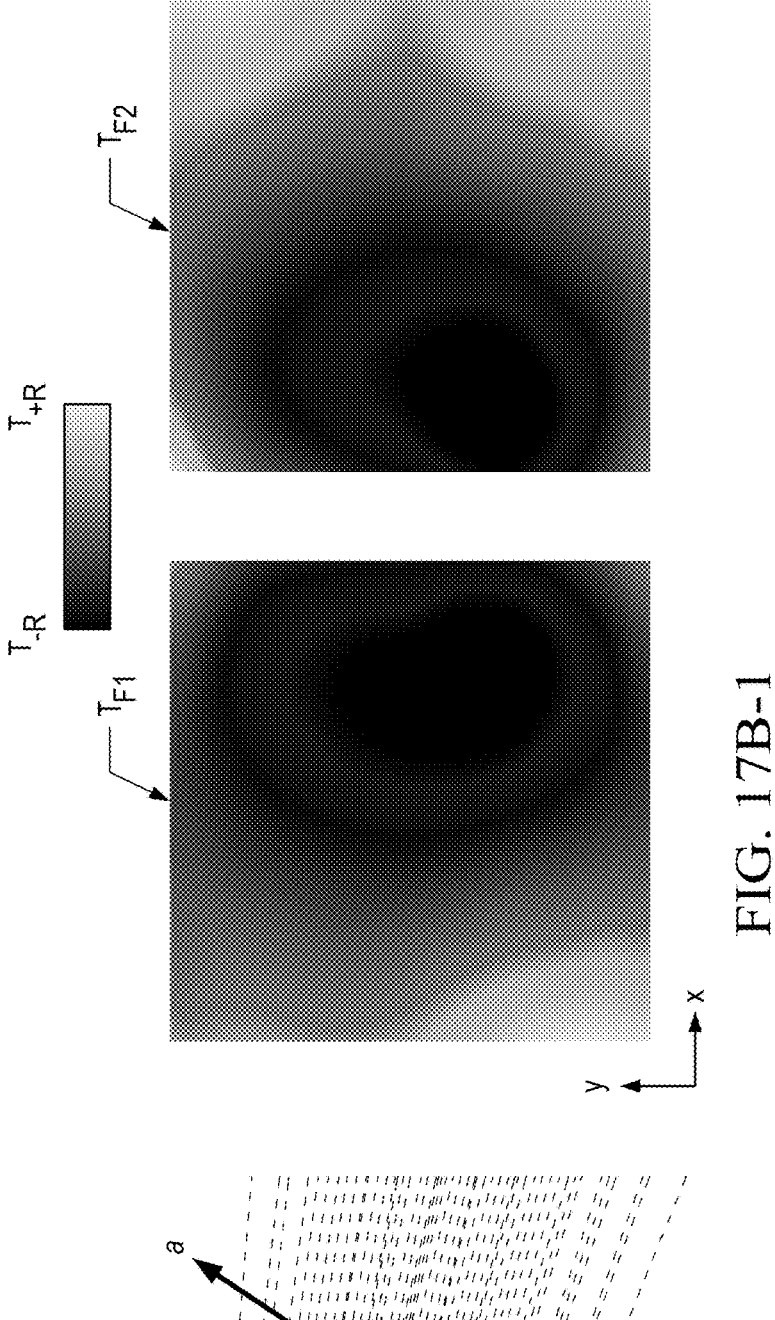
Figures 2, 17B:
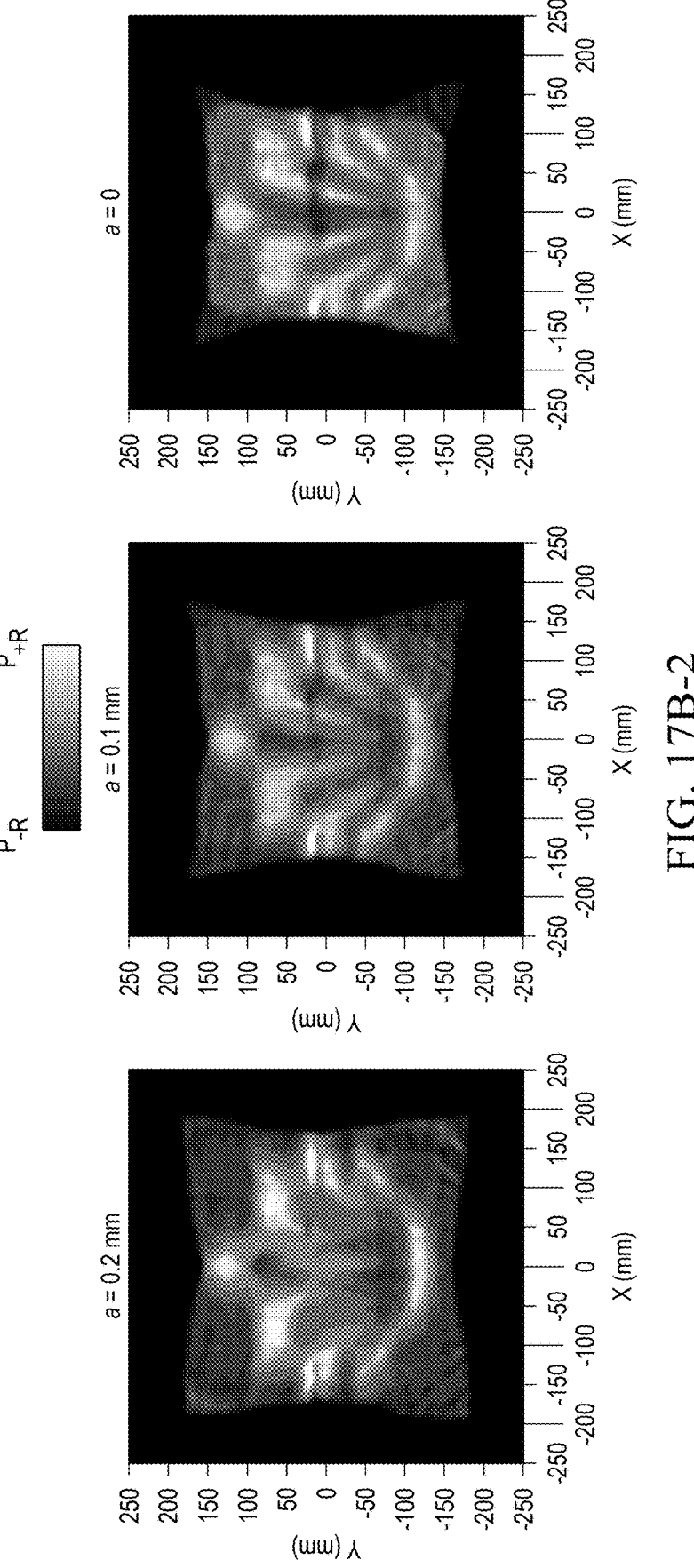
Figures 3, 17B:
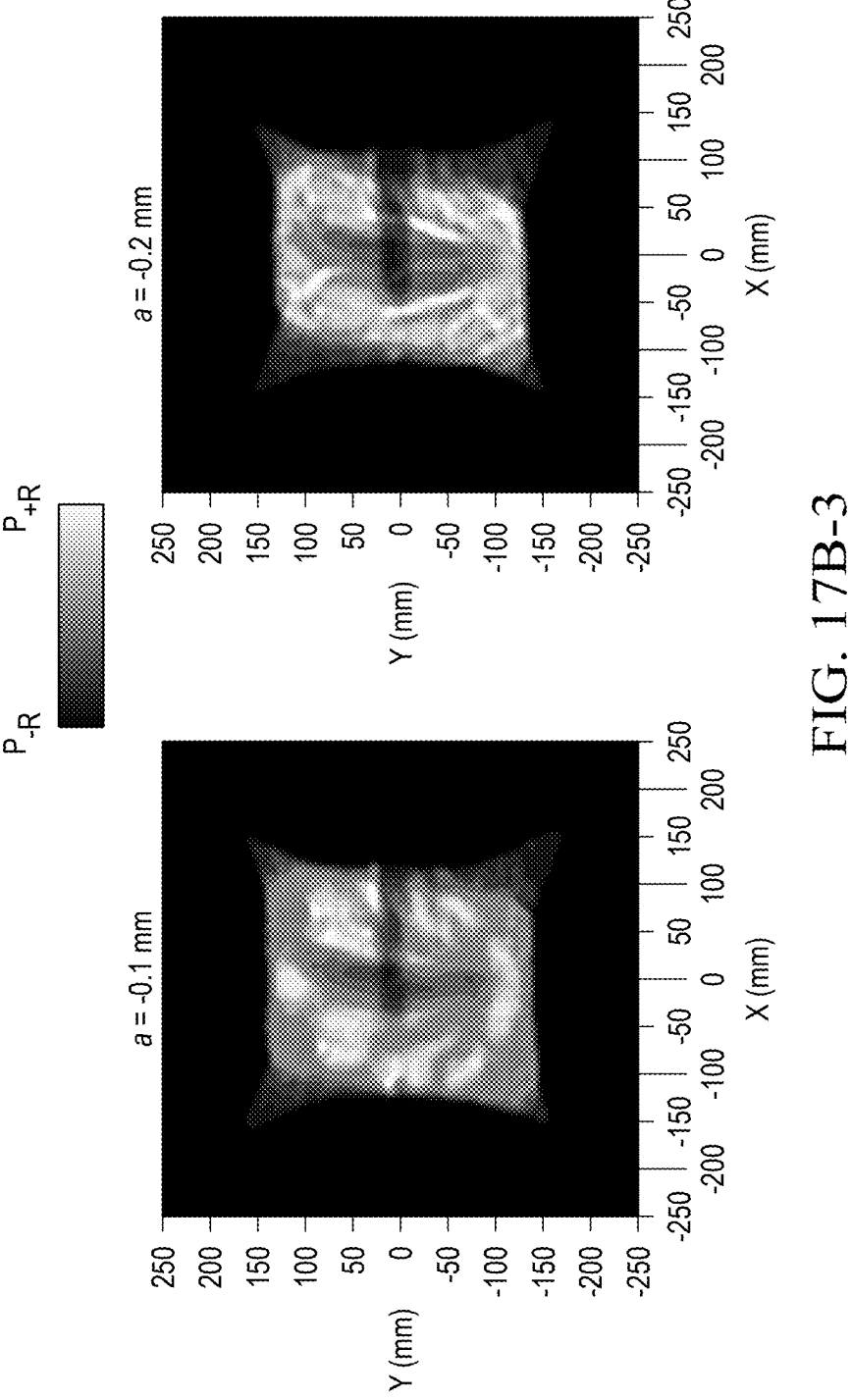

The resulting variable function optical system performance between the two boundaries is shown in FIGS. 17B-1, 17B-2, and 17B-3. FIGS. 17B-1 through 17B-3 show the variable function optical system with the first and second functional optically transmissive elements $F_1$, $F_2$. FIG. 17B-1 shows the functional thickness variations $T_{F_1}$, $T_{F_2}$. These thickness variations are shown in a gradient scale from a negative end of range $T_{-R}$ to a positive end of range $T_{+R}$. FIGS. 17B-2 and 17B-3 illustrate the change of output irradiance with various shifts (a=+0.2 mm, a=+0.1 mm, a=0 mm, a=−0.1 mm, a=−0.2 mm) between the functional optically transmissive elements $F_1$, $F_2$. The power of the irradiance patterns are shown in a gradient scale from a negative end of range $P_{-R}$ to a positive end of range $P_{+R}$. These results demonstrate the utility of the proposed general methodology for variable function optical systems and show the potential for novel applications.

Numerical Example 4

Figure 18A:
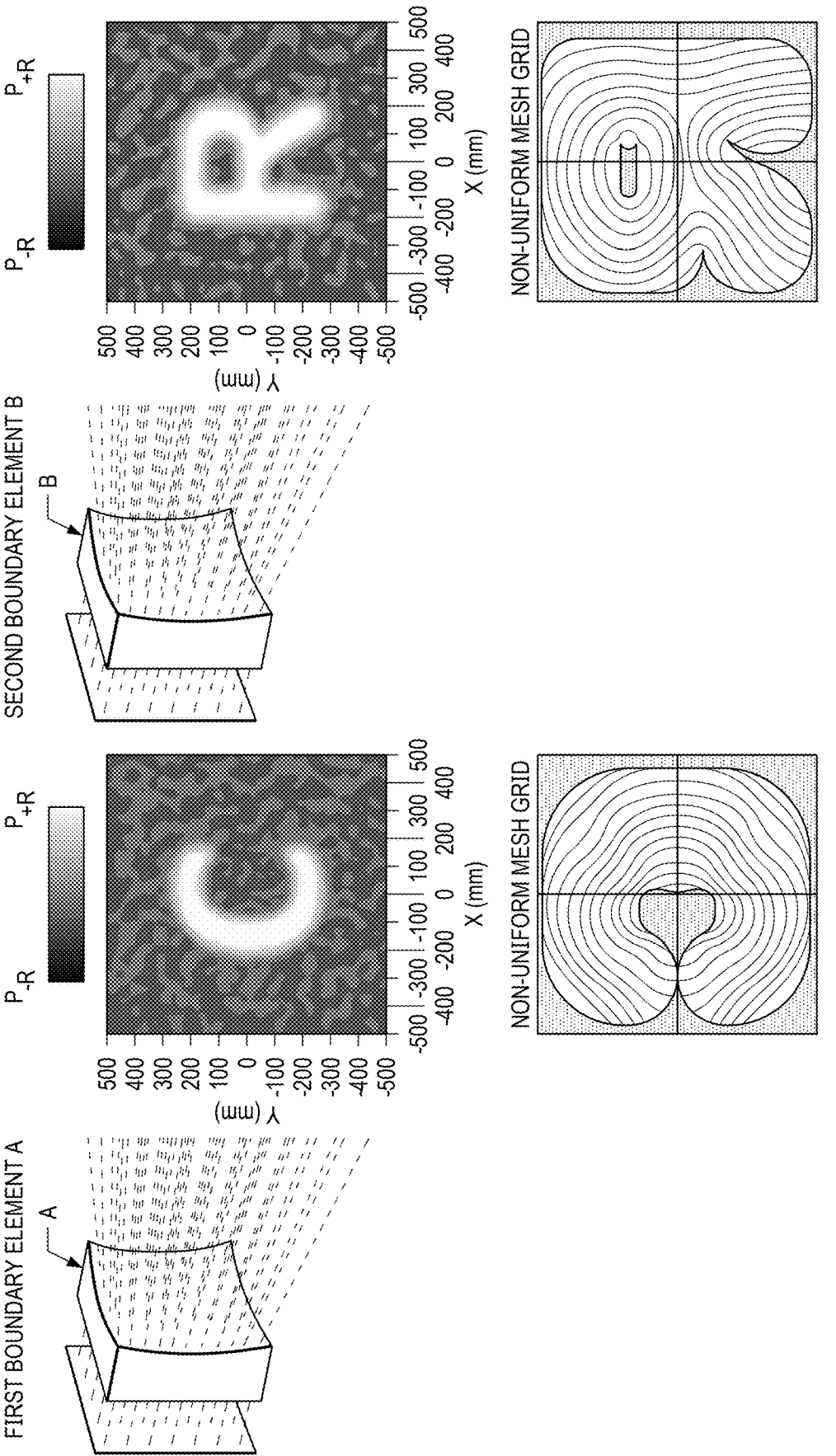
FIGS. 18A and 18B illustrate aspects of a fourth numerical example.

FIG. 18A shows boundary elements A, B with irradiance patterns as boundary conditions. The power changes are shown in a gradient scale from a negative end of range $P_{-R}$ to a positive end of range $P_{+R}$. FIG. 18A also shows non-uniform mesh grids that numerically represent the boundary elements A, B.

Figure 18B:
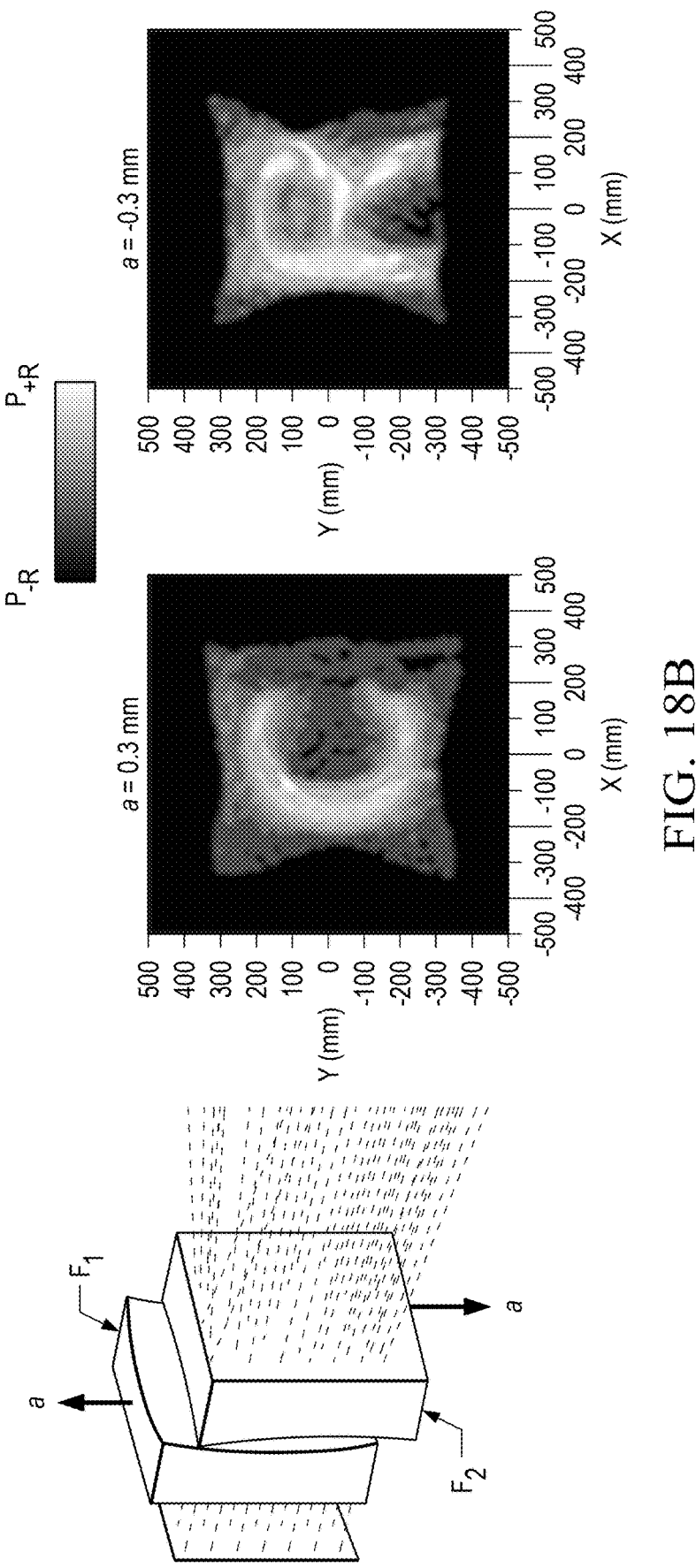

FIG. 18B shows the variable function optical system with the first and second functional optically transmissive elements $F_1$, $F_2$. FIG. 18B illustrates the change of output irradiance with various shifts (a=+0.3 mm, a=-0.3 mm) between the functional optically transmissive elements $F_1$, $F_2$. The power changes are shown in a gradient scale from a negative end of range $P_{-R}$ to a positive end of range $P_{+R}$. The correspondences between the irradiance pattern at a=+0.3 mm in FIG. 18B to the first boundary condition in FIG. 18A and between the irradiance pattern at a=-0.3 mm in FIG. 18B to the second boundary condition in FIG. 18A are evident.

Figure 19:
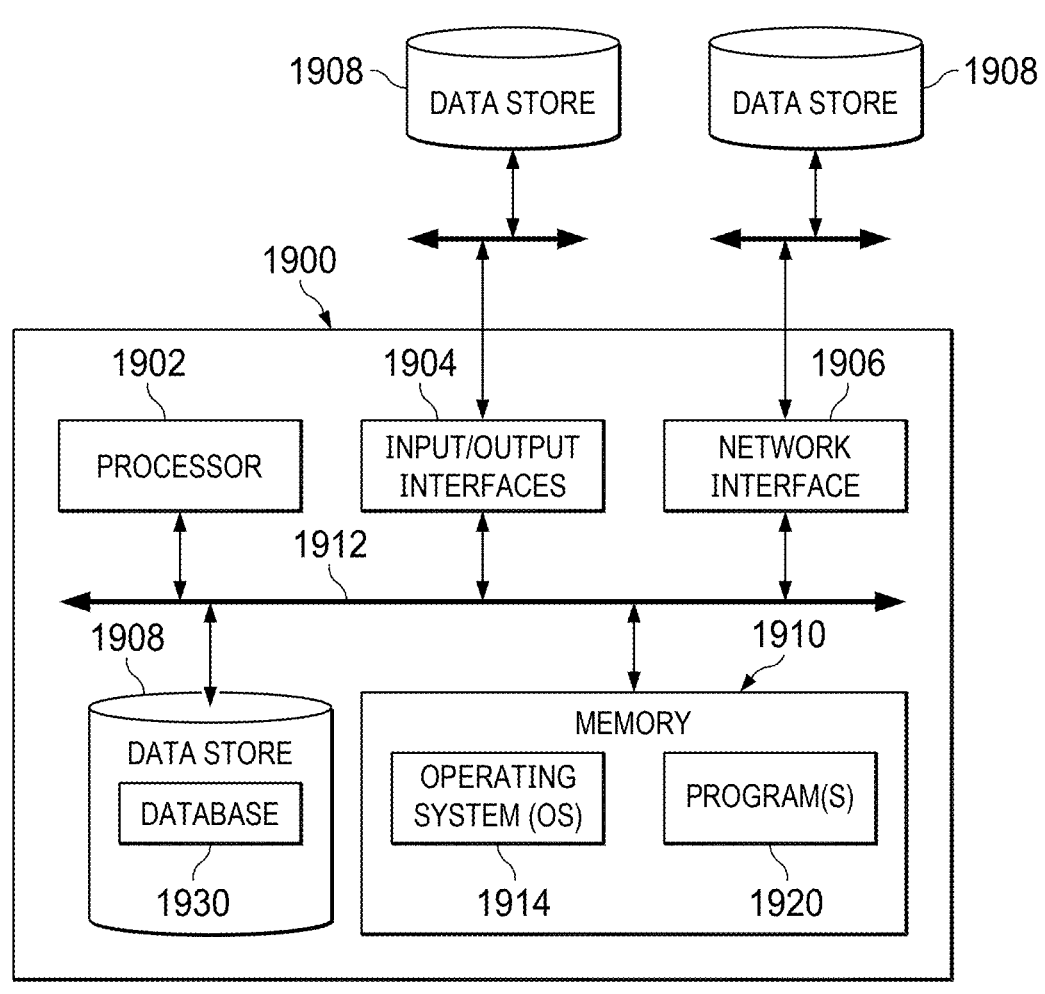
FIG. 19 is a block diagram of a server according to some examples.
Figure 20:
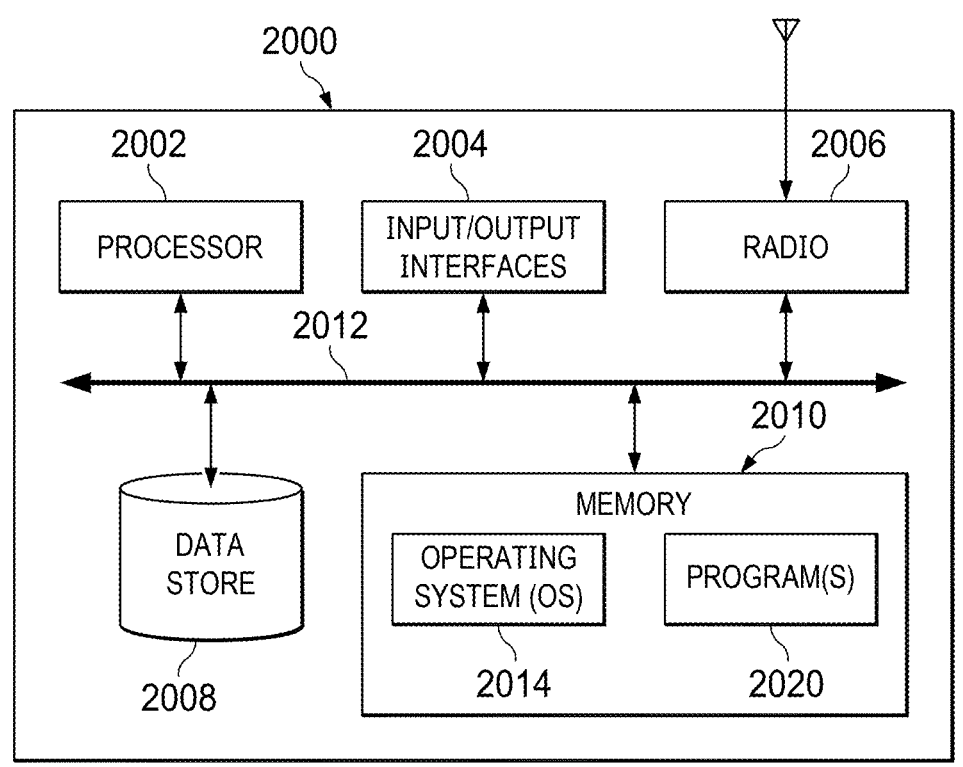
FIG. 20 is a block diagram of a client device according to some examples.

In some examples, the method 1000 of FIG. 10 (including the operations of block 1008 of FIG. 11, where applicable) may be performed by one or more computer systems (e.g., including one or more processors 1902, 2002), such as a server 1900 of FIG. 19 or client device 2000 of FIG. 20. Various operations of the method 1000 may be implemented in a distributed fashion across multiple computing systems in some examples. In other examples, the method 1000 may be performed on one computer system.

Referring now to FIG. 19, in an example, a block diagram illustrates a server 1900, which may be a type of computer system or computing platform. The server 1900 may be a digital computer that, in terms of hardware architecture, generally includes one or more processors 1902, input/output (I/O) interfaces 1904, a network interface 1906, a data store 1908, and memory 1910. FIG. 19 depicts the server 1900 in an oversimplified manner, and a practical example may include additional components and suitably configured processing logic to support known or conventional operating features that are not described in detail herein. The processor(s) 1902, I/O interfaces 1904, network interface 1906, data store 1908, and memory 1910 are communicatively coupled via a local interface 1912. The local interface 1912 may be, for example, one or more buses or other wired or wireless connections. The local interface 1912 may have additional elements, which are omitted for simplicity, such as controllers, buffers (caches), drivers, repeaters, and receivers, among many others, to enable communications. Further, the local interface 1912 may include address, control, and/or data connections to enable appropriate communications among the aforementioned components.

The processor(s) 1902 is a hardware device for executing software instructions. The processor 1902 may be any custom made or commercially available processor, a central processing unit (CPU), an auxiliary processor among several processors associated with the server 1900, a semiconductor-based microprocessor (in the form of a microchip or chip set), or generally any device for executing software instructions. When the server 1900 is in operation, the processor

1902 is configured to execute software (e.g., instructions) stored within the memory 1910, to communicate data to and from the memory 1910, and to generally control operations of the server 1900 pursuant to the software (e.g., instructions). The I/O interfaces 1904 may be used to receive user input from and/or for providing system output to one or more devices or components. User input may be provided via, for example, a keyboard, touch pad, and/or a mouse. System output may be provided via a display device and a printer (not shown). I/O interfaces 1904 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 1906 may be used to enable the server 1900 to communicate on a network, such as the Internet, a wide area network (WAN), a local area network (LAN), the like, etc. The network interface 1906 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 1906 may include address, control, and/or data connections to enable appropriate communications on the network.

A data store 1908 may be used to store data. The data store 1908 is a type of memory and may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1908 may incorporate electronic, magnetic, optical, and/or other types of storage media. In some examples, the data store 1908 may be located internal to the server 1900 such as, for example, an internal hard drive connected to the local interface 1912 in the server 1900. Additionally, in other examples, the data store 1908 may be located external to the server 1900 such as, for example, an external hard drive connected to the I/O interfaces 1904 (e.g., SCSI or USB connection). In a further example, the data store 1908 may be connected to the server 1900 through a network, such as, for example, a network attached file server.

The memory 1910 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1910 may incorporate electronic, magnetic, optical, and/or other types of storage media. The memory 1910 may be any non-transitory readable medium. Note that the memory 1910 may have a distributed architecture, where various components are situated remotely from one another, but can be accessed by the processor(s) 1902. The software in memory 1910 may include one or more software programs, each of which includes an ordered listing of executable instructions for implementing logical functions. The software in the memory 1910 may include a suitable operating system (O/S) 1914 and one or more programs 1920. The software (e.g., instructions) in the memory 1910 may embody various operations of the method 1000 of FIG. 10, and when one or more processors 1902 execute that software (e.g., instructions), the one or more processors 1902 perform the operations of the method 1000 of FIG. 10.

The operating system 1914 may control the execution of other computer programs, such as the one or more programs 1920, and may provide scheduling, input-output control, file and data management, memory management, and communication control and related services. The operating system 1914 may be, for example Windows NT, Windows 2000, Windows XP, Windows Vista, Windows 7, Windows 8, Windows 10, Windows Server 2003/2008/2012/2016 (all available from Microsoft, Corp. of Redmond, WA), Solaris (available from Sun Microsystems, Inc. of Palo Alto, CA), LINUX (or another UNIX variant) (available from Red Hat of Raleigh, NC and various other vendors), Android and variants thereof (available from Google, Inc. of Mountain View, CA), Apple OS X and variants thereof (available from Apple, Inc. of Cupertino, CA), or the like. The one or more programs 1920 may be configured to implement the various processes, algorithms, methods, techniques, etc. described herein.

Referring to FIG. 20, in an example, a block diagram illustrates a client device 2000, which may be a type of computer system or computing platform. The client device 2000 can be a digital device that, in terms of hardware architecture, generally includes one or more processors 2002, input/output (I/O) interfaces 2004, a radio 2006, a data store 2008, and memory 2010. FIG. 20 depicts the client device 2000 in an oversimplified manner, and a practical example may include additional components and suitably configured processing logic to support known or conventional operating features that are not described in detail herein. The processor(s) 2002, I/O interfaces 2004, radio 2006, data store 2008, and memory 2010 are communicatively coupled via a local interface 2012. The local interface 2012 can be, for example but not limited to, one or more buses or other wired or wireless connections, as is known in the art. The local interface 2012 can have additional elements, which are omitted for simplicity, such as controllers, buffers (caches), drivers, repeaters, and receivers, among many others, to enable communications. Further, the local interface 2012 may include address, control, and/or data connections to enable appropriate communications among the aforementioned components.

The processor(s) 2002 is a hardware device for executing software instructions. The processor 2002 can be any custom made or commercially available processor, a central processing unit (CPU), an auxiliary processor among several processors associated with the client device 2000, a semiconductor-based microprocessor (in the form of a microchip or chip set), or generally any device for executing software instructions. When the client device 2000 is in operation, the processor 2002 is configured to execute software (e.g., instructions) stored within the memory 2010, to communicate data to and from the memory 2010, and to generally control operations of the client device 2000 pursuant to the software (e.g., instructions). In an example, the processor 2002 may include a mobile optimized processor such as optimized for power consumption and mobile applications.

The I/O interfaces 2004 can be used to receive data and user input and/or for providing system output. User input can be provided via a plurality of I/O interfaces 2004, such as a keypad, a touch screen, a camera, a microphone, a scroll ball, a scroll bar, buttons, bar code scanner, voice recognition, eye gesture, and the like. System output can be provided via a display screen, such as a liquid crystal display (LCD), touch screen, and the like. The I/O interfaces 2004 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 2004 can include a graphical user interface (GUI) that enables a user to interact with the client device 2000. Additionally, the I/O interfaces 2004 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The radio 2006 enables wireless communication to an external access device or network. Any number of suitable wireless data communication protocols, techniques, or methodologies can be supported by the radio 2006, including: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g., 19G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 2008 may be used to store data and is therefore a type of memory. The data store 2008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 2008 may incorporate electronic, magnetic, optical, and/or other types of storage media.

The memory 2010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 2010 may incorporate electronic, magnetic, optical, and/or other types of storage media. The memory 2010 may be any non-transitory readable medium. Note that the memory 2010 may have a distributed architecture, where various components are situated remotely from one another, but can be accessed by the processor(s) 2002. The software in memory 2010 can include one or more software programs 2020, each of which includes an ordered listing of executable instructions for implementing logical functions. In the example of FIG. 20, the software in the memory 2010 includes a suitable operating system (O/S) 2014 and programs 2020. The software (e.g., instructions) in the memory 2010 may embody various operations of the method 1000 of FIG. 10, and when one or more processors 2002 execute that software (e.g., instructions), the one or more processors 2002 perform the operations of the method 1000 of FIG. 10.

The operating system 2014 may control the execution of other computer programs, and may provide scheduling, input-output control, file and data management, memory management, and communication control and related services. The operating system 2014 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like.

The programs 2020 may include various applications, add-ons, etc. configured to provide end user functionality with the client device 2000. For example, example programs 2020 may include, but not limited to, a web browser, social networking applications, streaming media applications, games, mapping and location applications, electronic mail applications, financial applications, and the like.

The terminology used herein is for the purpose of describing particular examples only and is not intended to be limiting. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the relevant art. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing various examples herein, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the claims.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:

obtaining, by one or more processors, a first boundary thickness variation of a first boundary element and a second boundary thickness variation of a second boundary element, the first boundary element being configured to obtain a first boundary condition of a variable function optical system, the second boundary element being configured to obtain a second boundary condition of the variable function optical system;

determining, by the one or more processors, a first functional thickness variation of a first optically transmissive element of the variable function optical system and a second functional thickness variation of a second optically transmissive element of the variable function optical system, wherein determining the first functional thickness variation includes a first sum of a first term and a second term, and determining the second functional thickness variation includes a second sum of a third term and a fourth term, each term of the first term and the third term being based on an integration of the first boundary thickness variation and the second boundary thickness variation, each term of the second term and the fourth term being based on an average thickness variation of the first boundary thickness variation and the second boundary thickness variation; and generating, by the one or more processors, a non-transitory design file that enables manufacturing the first and second optically transmissive elements, the design file comprising a first digital representation of the first optically transmissive element based on the first functional thickness variation and comprising a second digital representation of the second optically transmissive element based on the second functional thickness variation.

2. The method of claim 1 further comprising:

obtaining, by the one or more processors, a lateral shift range of the first optically transmissive element and the second optically transmissive element of the variable function optical system, wherein each term of the first term and the third term is further based on the lateral shift range.

3. The method of claim 1, wherein obtaining the first boundary thickness variation and the second boundary thickness variation includes receiving, by the one or more processors, the first boundary thickness variation and the second boundary thickness variation.

4. The method of claim 1, wherein obtaining the first boundary thickness variation and the second boundary thickness variation includes:

receiving, by the one or more processors, a first thickness of the first boundary element and a second thickness of the second boundary element;

calculating, by the one or more processors, the first boundary thickness variation based on the first thickness; and calculating, by the one or more processors, the second boundary thickness variation based on the second thickness.

5. The method of claim 1, wherein obtaining the first boundary thickness variation and the second boundary thickness variation includes:

receiving, by the one or more processors, the first boundary condition of the first boundary element and the second boundary condition of the second boundary element;

determining, by the one or more processors, a first thickness of the first boundary element based on the first boundary condition;

determining, by the one or more processors, a second thickness of the second boundary element based on the second boundary condition;

calculating, by the one or more processors, the first boundary thickness variation based on the first thickness; and calculating, by the one or more processors, the second boundary thickness variation based on the second thickness.

6. The method of claim 1, wherein:

the first boundary thickness variation is represented by $T_A(x,y)$;

the second boundary thickness variation is represented by $T_B(x,y)$;

a maximum lateral shift of each of the first optically transmissive element and the second optically transmissive element is represented by an absolute value of $a_{max}$ wherein each of the first optically transmissive element and the second optically transmissive element is configured to be translated in the variable function optical system by a lateral shift range $2a_{max}$;
the first term is equal to $$\frac{1}{2a_{max}} \int \frac{T_A(x, y) - T_B(x, y)}{2} dx;$$

the second term is equal to $$\frac{T_A(x, y) + T_B(x, y)}{4};$$

the third term is equal to $$-\frac{1}{2a_{max}} \int \frac{T_A(x, y) - T_B(x, y)}{2} dx;$$

and
the fourth term is equal to $$\frac{T_A(x, y) + T_B(x, y)}{4}.$$

7. The method of claim 1, wherein the first functional thickness variation further includes a third sum of the first sum and a first tilt term, and the second functional thickness variation includes a fourth sum of the second sum and a second tilt term.

8. The method of claim 1, wherein determining the first functional thickness variation and the second functional thickness variation includes:
   calculating the average thickness variation of the first boundary thickness variation and the second boundary thickness variation;
   calculating a first extracted thickness variation and a second extracted thickness variation comprising extracting the average thickness variation from the first boundary thickness variation and the second boundary thickness variation, respectively;
   calculating a first transformed thickness variation and a second transformed thickness variation comprising integrating the first extracted thickness variation or the second extracted thickness variation, the first transformed thickness variation being the first term, the second transformed thickness variation being the second term; and
   calculating the first functional thickness variation and the second functional thickness variation, the third term being half of the average thickness variation, the fourth term being half of the average thickness variation.

9. The method of claim 1 further comprising:
manufacturing the first optically transmissive element based on the first digital representation of the design file; and
manufacturing the second optically transmissive element based on the second digital representation of the design file.

10. The method of claim 9 further comprising:
operating the variable function optical system comprising the first optically transmissive element and the second optically transmissive element, wherein:
   when light is transmitted through the first optically transmissive element and the second optically transmissive element, and when the first optically transmissive element and the second optically transmissive element are positioned at respective opposing positive maximum lateral shifts, the light has a boundary condition corresponding to the first boundary condition; and
   when light is transmitted through the first optically transmissive element and the second optically transmissive element, and when the first optically transmissive element and the second optically transmissive element are positioned at respective opposing negative maximum lateral shifts, the light has a boundary condition corresponding to the second boundary condition.

11. A system comprising:
a memory storing instructions; and
one or more processors, coupled with the memory and to execute the instructions, the instructions when executed cause the one or more processors to:
   obtain a first boundary thickness variation of a first boundary element and a second boundary thickness variation of a second boundary element, the first boundary element being configured to obtain a first boundary condition of a variable function optical system, the second boundary element being configured to obtain a second boundary condition of the variable function optical system;
   determine a first functional thickness variation of a first optically transmissive element of the variable function optical system and a second functional thickness variation of a second optically transmissive element of the variable function optical system, wherein determining the first functional thickness variation includes a first sum of a first term and a second term, and determining the second functional thickness variation includes a second sum of a third term and a fourth term, each term of the first term and the third term being based on an integration of the first boundary thickness variation and the second boundary thickness variation, each term of the second term and the fourth term being based on an average thickness variation of the first boundary thickness variation and the second boundary thickness variation; and
   generate a non-transitory design file that enables manufacturing the first and second optically transmissive elements, the design file comprising a first digital representation of the first optically transmissive element based on the first functional thickness variation and comprising a second digital representation of the second optically transmissive element based on the second functional thickness variation.

12. The system of claim 11, wherein the instructions when executed further cause the one or more processors to:
   obtain a lateral shift range of the first optically transmissive element and the second optically transmissive element of the variable function optical system, wherein each term of the first term and the third term is further based on the lateral shift range.

13. The system of claim 11, wherein the instructions when executed causing the one or more processors to obtain the first boundary thickness variation and the second boundary thickness variation further cause the one or more processors to:

receive the first boundary thickness variation and the second boundary thickness variation.

14. The system of claim 11, wherein the instructions when executed causing the one or more processors to obtain the first boundary thickness variation and the second boundary thickness variation further cause the one or more processors to:

receive a first thickness of the first boundary element and a second thickness of the second boundary element;

calculate the first boundary thickness variation based on the first thickness; and calculate the second boundary thickness variation based on the second thickness.

15. The system of claim 11, wherein the instructions when executed causing the one or more processors to obtain the first boundary thickness variation and the second boundary thickness variation further cause the one or more processors to:

receive the first boundary condition of the first boundary element and the second boundary condition of the second boundary element;

determine a first thickness of the first boundary element based on the first boundary condition;

determine a second thickness of the second boundary element based on the second boundary condition;

calculate the first boundary thickness variation based on the first thickness; and calculate the second boundary thickness variation based on the second thickness.

16. The system of claim 11, wherein:

the first boundary thickness variation is represented by $T_A(x,y)$;

the second boundary thickness variation is represented by $T_B(x,y)$;

a maximum lateral shift of each of the first optically transmissive element and the second optically transmissive element is represented by an absolute value of $a_{max}$ wherein each of the first optically transmissive element and the second optically transmissive element is configured to be translated in the variable function optical system by a lateral shift range $2a_{max}$;

the first term is equal to $$\frac{1}{2a_{max}} \int \frac{T_A(x, y) - T_B(x, y)}{2} dx;$$

the second term is equal to $$\frac{T_A(x, y) + T_B(x, y)}{4};$$

the third term is equal to $$-\frac{1}{2a_{max}} \int \frac{T_A(x, y) - T_B(x, y)}{2} dx;$$

and the fourth term is equal to $$\frac{T_A(x, y) + T_B(x, y)}{4}.$$

17. The system of claim 11, wherein the first functional thickness variation further includes a third sum of the first sum and a first tilt term, and the second functional thickness variation includes a fourth sum of the second sum and a second tilt term.

18. The system of claim 11, wherein the instructions when executed causing the one or more processors to determine the first functional thickness variation and the second functional thickness variation further cause the one or more processors to:

calculate the average thickness variation of the first boundary thickness variation and the second boundary thickness variation;

calculate a first extracted thickness variation and a second extracted thickness variation comprising extracting the average thickness variation from the first boundary thickness variation and the second boundary thickness variation, respectively;

calculate a first transformed thickness variation and a second transformed thickness variation comprising integrating the first extracted thickness variation or the second extracted thickness variation, the first transformed thickness variation being the first term, the second transformed thickness variation being the second term; and calculate the first functional thickness variation and the second functional thickness variation, the third term being half of the average thickness variation, the fourth term being half of the average thickness variation.

19. A method comprising:

obtaining, by one or more computer systems, a first boundary thickness variation $T_A(x,y)$ of a first boundary element and a second boundary thickness variation $T_B(x,y)$ of a second boundary element, the first boundary element being configured to obtain a first boundary condition of a variable function optical system, the second boundary element being configured to obtain a second boundary condition of the variable function optical system;

obtaining, by the one or more computer systems, a maximum lateral shift, represented by an absolute value of $a_{max}$ of each of a first optically transmissive element and a second optically transmissive element of the variable function optical system, wherein each of the first optically transmissive element and the second optically transmissive element is configured to be translated in the variable function optical system by a lateral shift range $2a_{max}$;

determining, by the one or more computer systems, a first functional thickness variation $T_{F_1}(x,y)$ of the first optically transmissive element and a second functional thickness variation $T_{F_2}(x,y)$ of the second optically transmissive element, wherein:

$T_{F_1}(x,y)$ is calculated to include $$\frac{1}{2a_{max}} \int \frac{T_A(x, y) - T_B(x, y)}{2} dx + \frac{T_A(x, y) + T_B(x, y)}{4};$$

and $T_{F_2}(x,y)$ is calculated to include $$-\frac{1}{2a_{max}} \int \frac{T_A(x, y) - T_B(x, y)}{2} dx + \frac{T_A(x, y) + T_B(x, y)}{4};$$

5 and generating, by the one or more computer systems, a design file comprising a first digital representation of the first optically transmissive element based on the first functional thickness variation $T_{F_1}(x,y)$ and comprising a second digital representation of the second optically transmissive element based on the second functional thickness variation $T_{F_2}(x,y)$.

10

15

20. The method of claim 19 further comprising determining a tilt term $D_x$, wherein:

$$T_{F_1}(x, y) = \frac{1}{2a_{max}} \int \frac{T_A(x, y) - T_B(x, y)}{2} dx + \frac{T_A(x, y) + T_B(x, y)}{4} + D_x;$$

20 and $$T_{F_2}(x, y) = -\frac{1}{2a_{max}} \int \frac{T_A(x, y) - T_B(x, y)}{2} dx + \frac{T_A(x, y) + T_B(x, y)}{4} - D_x.$$

25

\* \* \* \* \*